US012660015B2

(12) United States Patent (10) Patent No.: US 12,660,015 B2
Sun (45) Date of Patent: Jun. 16, 2026

(54) METHOD FOR ESTABLISHING BACKHAUL NETWORK, COMMUNICATION METHOD, AND COMMUNICATION APPARATUS

(71) Applicant: HUAWEI TECHNOLOGIES CO., LTD., Shenzhen (CN)

(72) Inventor: Huan Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 534 days.

(21) Appl. No.: 18/174,705

(22) Filed: Feb. 27, 2023

(65) Prior Publication Data

US 2023/0224985 A1 Jul. 13, 2023

Related U.S. Application Data

(63) Continuation of application No. PCT/CN2021/111526, filed on Aug. 9, 2021.

(30) Foreign Application Priority Data

Aug. 31, 2020 (CN) .......................... 202010893413.2

(51) Int. Cl.
*H04W 76/12* (2018.01)
*H04W 24/02* (2009.01)
*H04B 7/0413* (2017.01)

(52) U.S. Cl.
CPC .......... *H04W 76/12* (2018.02); *H04W 24/02* (2013.01); *H04B 7/0413* (2013.01)

(58) Field of Classification Search
CPC ... H04W 76/12; H04W 24/02; H04W 72/044; H04B 7/0413; H04B 7/024; H04B 7/04013
See application file for complete search history.

(56) References Cited

U.S. PATENT DOCUMENTS

| | | | | |
|---|---|---|---|---|
| 2011/0051654 A1* | 3/2011 | Blankenship | ......... | H04W 72/23 370/315 |
| 2014/0044041 A1* | 2/2014 | Moshfeghi | .......... | H04L 12/6418 370/328 |
| 2016/0198475 A1* | 7/2016 | Uchiyama | .............. | H04B 17/11 370/329 |
| 2017/0069967 A1* | 3/2017 | Shrekenhamer | ......... | H01Q 1/28 |
| 2019/0289560 A1 | 9/2019 | Black et al. | | |

(Continued)

OTHER PUBLICATIONS

Anonymous:"Protocol specification (Release 14),technical specifiation",3GPP TS 36.331,V14.0.0,Oct. 4, 2016,XP055515480,total 644 pages (2016).

(Continued)

*Primary Examiner* — Steven Hieu D Nguyen

(57) ABSTRACT

A first communication apparatus receives first indication information, used to determine an operating mode and/or operating configuration information of the first communication apparatus in a backhaul network, the first communication apparatus includes a first antenna array. The first antenna array is an electromagnetic metasurface antenna array. The first communication apparatus establishes the backhaul network based on the first indication information. A backhaul network is established by using an electromagnetic metasurface antenna array, to implement a flexible and high-performance D-MIMO transmission solution.

15 Claims, 13 Drawing Sheets

(56)                  References Cited

U.S. PATENT DOCUMENTS

| | | | | |
|---|---|---|---|---|
| 2021/0029624 A1* | 1/2021 | Liu | .................... | H04B 7/15557 |
| 2021/0126359 A1* | 4/2021 | Kim | ...................... | H04B 7/145 |
| 2021/0234592 A1* | 7/2021 | Ashrafi | ................ | H01Q 21/065 |
| 2021/0321395 A1* | 10/2021 | Leng | .................... | H04L 5/0094 |
| 2022/0384954 A1* | 12/2022 | Moon | ............... | H01Q 15/0086 |

OTHER PUBLICATIONS

Wu Qingqing et al:"Intelligent Reflecting Surface-Aided Wireless Communications:A Tutorial",IEEE Transactions on Communications, vol. 69,No. 5,Jul. 7, 2020,XP055915743,total 74 pages (2020).
Wu Qingqing et al:"Intelligent Reflecting Surface Enhanced Wireless Network:Joint Active and Passive Beamforming Design",2018 IEEE Global Communications Conference (Globecom),Dec. 9, 2018,XP033519782,total 6 pages (2018).
Extended European Search Report issued in EP Application No. 21860119.3 (Apr. 17, 2024).
Partial Supplementary European Search Report issued in EP Application No. 21860119.3 (Feb. 9, 2024).

* cited by examiner

Reflecting
subarray

Receiving
subarray

Electromagnetic
metasurface
antenna array

Reflecting
subarray

Receiving
subarray

Conventional
antenna array

Electromagnetic
metasurface
antenna array

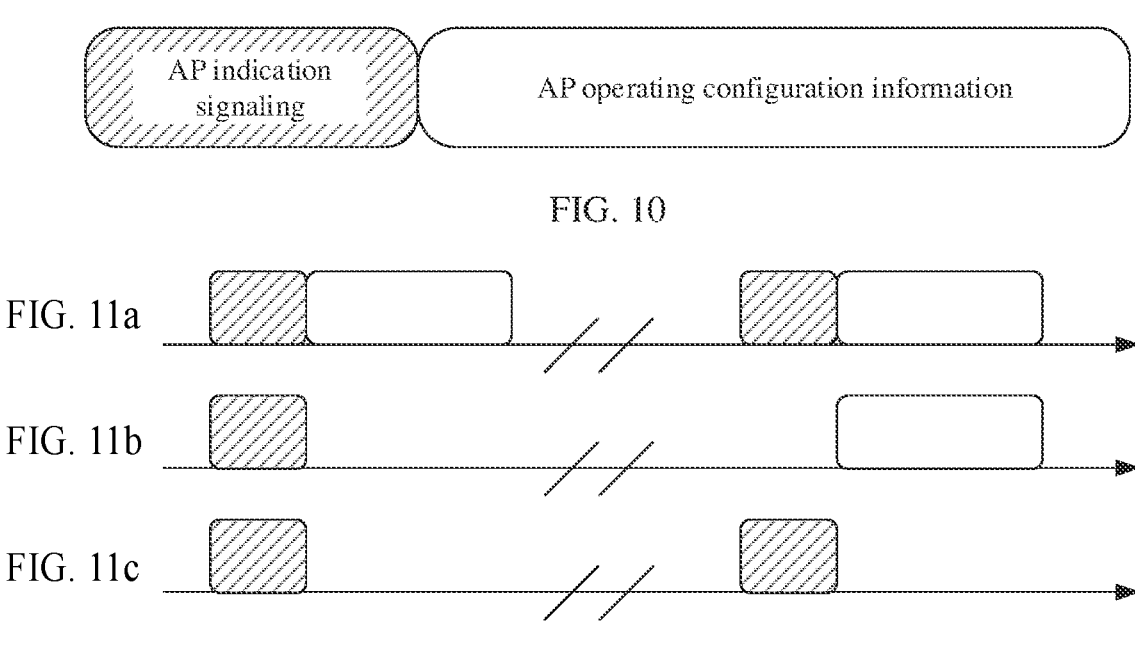
FIG. 10
FIG. 11a
FIG. 11b
FIG. 11c
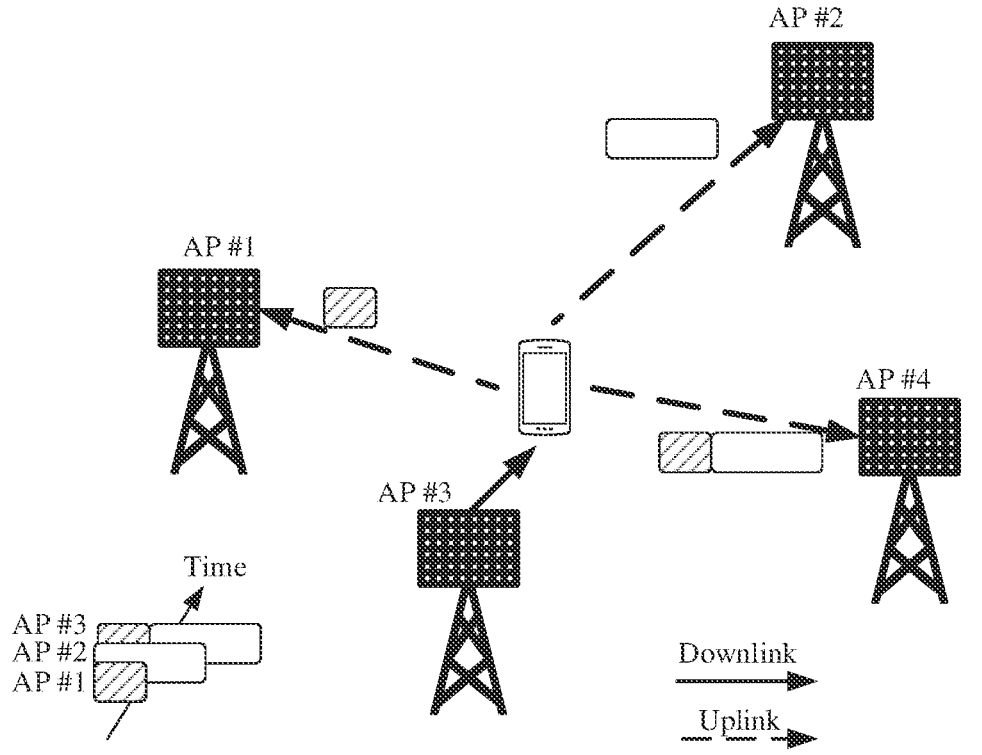
FIG. 12

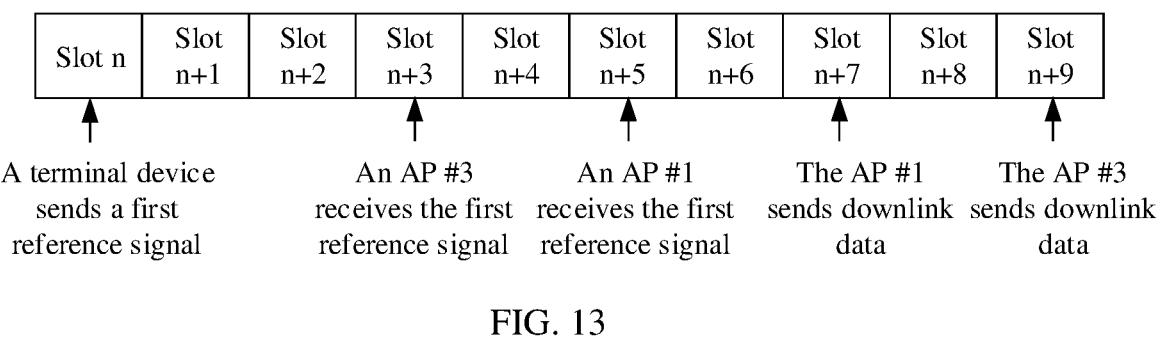

| Slot n | Slot n+1 | Slot n+2 | Slot n+3 | Slot n+4 | Slot n+5 | Slot n+6 | Slot n+7 | Slot n+8 | Slot n+9 |
|--------|----------|----------|----------|----------|----------|----------|----------|----------|----------|

A terminal device sends a first reference signal

An AP #3 receives the first reference signal

An AP #1 receives the first reference signal

The AP #1 sends downlink data

The AP #3 sends downlink data

FIG. 13

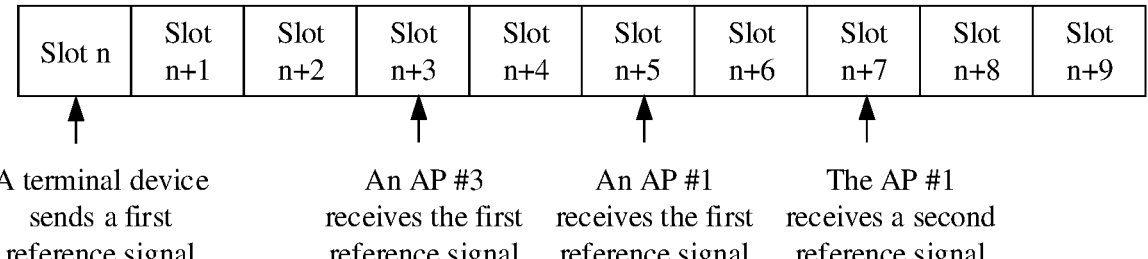

| Slot n | Slot n+1 | Slot n+2 | Slot n+3 | Slot n+4 | Slot n+5 | Slot n+6 | Slot n+7 | Slot n+8 | Slot n+9 |
|--------|----------|----------|----------|----------|----------|----------|----------|----------|----------|

A terminal device sends a first reference signal

An AP #3 receives the first reference signal

An AP #1 receives the first reference signal

The AP #1 receives a second reference signal

FIG. 14

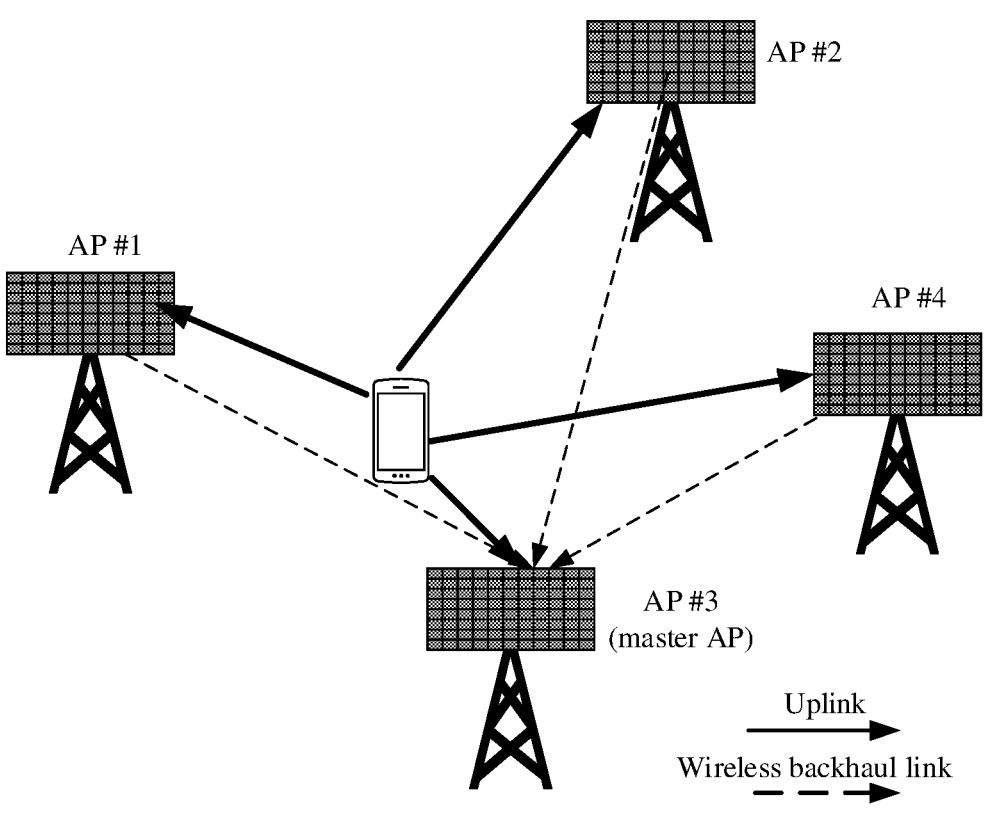

FIG. 15

| CP indication | | CP parameter configuration |
|---|---|---|
| b0 | b1 | Specific configuration information of a dynamic CP |
| 0 | 0 | System default |
| 0 | 1 | System default |
| 1 | 0 | Dynamic indication information |
| 1 | 1 | Dynamic indication information |

Communication apparatus 3000

US 12,660,015 B2

1

METHOD FOR ESTABLISHING BACKHAUL
NETWORK, COMMUNICATION METHOD,
AND COMMUNICATION APPARATUS

CROSS-REFERENCE TO RELATED
APPLICATIONS

This application is a continuation of International Patent
Application No. PCT/CN2021/111526, filed on Aug. 9,
2021, which claims priority to Chinese Patent Application
No. 202010893413.2, filed on Aug. 31, 2020. The disclo-
sures of the aforementioned applications are hereby incor-
porated by reference in their entireties.

TECHNICAL FIELD

This specification relates to the communication field, and
more specifically, to a method for establishing a backhaul
network, a communication method, and a communication
apparatus.

BACKGROUND

To improve communication efficiency, a massive mul-
tiple-input multiple-output (MIMO) antenna system was
introduced into a 5th generation (5G) communication sys-
tem. Further, to achieve better user experience performance
for all users within a coverage area of a cell or a user moving
within a cell, a transmission architecture based on central-
ized massive MIMO evolved into a distributed MIMO
(D-MIMO) system architecture. However, a fixed backhaul
network and a wireless backhaul network proposed in a
current 5G system have disadvantages of a large delay
variation and low transmission efficiency respectively, mak-
ing it difficult to implement flexible and high-performance
D-MIMO transmission.

SUMMARY

This specification provides a method for establishing a
backhaul network, to implement flexible and high-perfor-
mance D-MIMO transmission.

According to a first aspect, a method for establishing a
backhaul network is provided. The method may include:

A first communication apparatus receives first indication
information, where the first indication information is used to
determine an operating mode and/or operating configuration
information of the first communication apparatus in a back-
haul network, the first communication apparatus includes a
first antenna array, and the first antenna array is an electro-
magnetic metasurface antenna array. The first communica-
tion apparatus establishes the backhaul network based on the
first indication information.

According to the foregoing technical solution, a backhaul
network construction solution used to support D-MIMO
transmission is dynamically configured for a coordinating
access point (AP) (namely, the first communication appara-
tus), so that flexible D-MIMO transmission can be imple-
mented. A new electromagnetic metasurface antenna array is
introduced, thereby reducing a delay of the backhaul net-
work and improving transmission efficiency. In addition, the
electromagnetic metasurface antenna array has a simple
structure, quite few active devices, and quite low power
consumption, is easy to implement and deploy, and is
especially applicable to a scenario with a high frequency
band, high bandwidth, and massive antennas.

With reference to the first aspect, in some implementa-
tions of the first aspect, the operating mode of the first
communication apparatus in the backhaul network includes
one or more of the following: participating in data trans-
mission through a fixed backhaul network, participating in
data transmission through a first wireless backhaul network,
and participating in data transmission through a second
wireless backhaul network, where the data transmission
includes uplink data transmission and/or downlink data
transmission, and the second wireless backhaul network
includes the first communication apparatus.

With reference to the first aspect, in some implementa-
tions of the first aspect,
  operating configuration information corresponding to the
    fixed backhaul network includes at least one of the
    following: a transmission capacity and a delay variation
    range;
  operating configuration information corresponding to the
    first wireless backhaul network includes at least one of
    the following: time domain resource configuration
    information, frequency domain resource configuration
    information, space domain resource configuration
    information, and data transmission sequence informa-
    tion; and
  operating configuration information corresponding to the
    second wireless backhaul network includes at least one
    of the following: a time at which the second wireless
    backhaul network is established, a transmission object,
    a transmission waveform, and a modulation scheme,
    where the time at which the second wireless backhaul
    network is established includes a time at which a
    reflecting subarray is enabled.

With reference to the first aspect, in some implementa-
tions of the first aspect, the first communication apparatus
further includes a second antenna array.

With reference to the first aspect, in some implementa-
tions of the first aspect, the first antenna array includes a
reflecting subarray, or the first antenna array includes a
reflecting subarray and a receiving subarray.

With reference to the first aspect, in some implementa-
tions of the first aspect, the first indication information
includes a first index value, and the method further includes:
The first communication apparatus determines, based on a
first mapping relationship, an operating mode and/or oper-
ating configuration information corresponding to the first
index value, where the first mapping relationship is used to
indicate a correspondence between different index values
and different operating modes and/or operating configura-
tion information.

According to the foregoing technical solution, the first
mapping relationship is prestored in the coordinating AP, so
that a master AP or a central processing unit can configure
the operating configuration information for the coordinating
AP by sending the first index value, thereby reducing
sending overheads of the master AP or the central processing
unit.

With reference to the first aspect, in some implementa-
tions of the first aspect, the first communication apparatus
receives a first reference signal from a second communica-
tion apparatus, where the first reference signal is used to
determine a first transmission delay, the first transmission
delay is a transmission delay between the second commu-
nication apparatus and a third communication apparatus, and
the second communication apparatus is synchronized with
the third communication apparatus in time; and the first
communication apparatus sends data to the second commu-
nication apparatus, where a moment at which the data is sent is determined based on a first time offset, the first time offset is determined by the first communication apparatus based on the first reference signal, and the first time offset is a time offset of the first communication apparatus relative to the third communication apparatus.

According to the foregoing technical solution, the coordinating AP calculates a time offset between the coordinating AP and the master AP (namely, the third communication apparatus) based on a reference signal that comes from a terminal device (namely, the second communication apparatus), so that each coordinating AP can pre-adjust a moment at which downlink data is to be sent. In this way, downlink data sent by the master AP and each coordinating AP can simultaneously arrive at the terminal device. Therefore, a processing capability of the terminal device can be simplified, and receiving performance of the terminal device can be improved.

With reference to the first aspect, in some implementations of the first aspect, the method further includes: The first communication apparatus receives a first reference signal from a second communication apparatus, where the second communication apparatus is synchronized with a third communication apparatus in time. The first communication apparatus sends a second reference signal to the third communication apparatus, where the second reference signal is obtained by adjusting the first reference signal. The first communication apparatus receives second indication information from the third communication apparatus, where the second indication information is used to indicate a first time offset, and the first time offset is a time offset of the first communication apparatus relative to the third communication apparatus. The first communication apparatus sends data to the second communication apparatus, where a moment at which the data is sent is determined based on the first time offset.

According to the foregoing technical solution, the master AP calculates a time offset between the master AP and each coordinating AP based on a reference signal that comes from the terminal device and a reference signal reflected by the coordinating AP, and sends the time offset to each coordinating AP, so that each coordinating AP can pre-adjust a moment at which downlink data is to be sent. In this way, downlink data sent by the master AP and each coordinating AP can simultaneously arrive at the terminal device. Therefore, a processing capability of the terminal device can be simplified, and receiving performance of the terminal device can be improved.

According to a second aspect, a method for establishing a backhaul network is provided. The method may include:

A third communication apparatus determines first indication information, where the first indication information is used to determine an operating mode and/or operating configuration information of the first communication apparatus in a backhaul network, the first communication apparatus includes a first antenna array, and the first antenna array is an electromagnetic metasurface antenna array. The third communication apparatus sends the first indication information to the first communication apparatus.

According to the foregoing technical solution, a master AP (namely, the third communication apparatus) dynamically configures, for a coordinating AP (namely, the first communication apparatus), a backhaul network construction solution used to support D-MIMO transmission, so that flexible D-MIMO transmission can be implemented. A new electromagnetic metasurface antenna array is introduced, thereby reducing a delay of the backhaul network and improving transmission efficiency. In addition, the electromagnetic metasurface antenna array has a simple structure, quite few active devices, and quite high power consumption, is easy to implement and deploy, and is especially applicable to a scenario with a high frequency band, high bandwidth, and massive antennas.

With reference to the second aspect, in some implementations of the second aspect, the operating mode of the first communication apparatus in the backhaul network includes one or more of the following: participating in data transmission through a fixed backhaul network, participating in data transmission through a first wireless backhaul network, and participating in data transmission through a second wireless backhaul network, where the data transmission includes uplink data transmission and/or downlink data transmission, and the second wireless backhaul network includes the first communication apparatus.

With reference to the second aspect, in some implementations of the second aspect, operating configuration information corresponding to the fixed backhaul network includes at least one of the following: a transmission capacity and a delay variation range;

operating configuration information corresponding to the first wireless backhaul network includes at least one of the following: time domain resource configuration information, frequency domain resource configuration information, space domain resource configuration information, and data transmission sequence information; and operating configuration information corresponding to the second wireless backhaul network includes at least one of the following: a time at which the second wireless backhaul network is established, a transmission object, a transmission waveform, and a modulation scheme.

With reference to the second aspect, in some implementations of the second aspect, the first communication apparatus further includes a second antenna array.

With reference to the second aspect, in some implementations of the second aspect, the first antenna array includes a reflecting subarray, or the first antenna array includes a reflecting subarray and a receiving subarray.

With reference to the second aspect, in some implementations of the second aspect, the first indication information includes a first index value, and that a third communication apparatus determines first indication information includes: The third communication apparatus determines the first index value based on a first mapping relationship, where the first mapping relationship is used to indicate a correspondence between different index values and different operating modes and/or operating configuration information.

According to the foregoing technical solution, the master AP may configure the operating configuration information for the coordinating AP by sending the first index value, thereby reducing sending overheads of the master AP.

With reference to the second aspect, in some implementations of the second aspect, the method further includes:

The third communication apparatus receives a second reference signal from the first communication apparatus, where the second reference signal is obtained by the first communication apparatus by adjusting a first reference signal that comes from a second communication apparatus, and the second communication apparatus is synchronized with the third communication apparatus in time. The third communication apparatus determines second indication information based on the second reference signal, where the second indication information is used to indicate a first time offset, the first time offset is a time offset of the first communication apparatus relative to the third communication apparatus, and the first time offset is used by the first communication apparatus to determine a moment at which data is to be sent to the second communication apparatus. The third communication apparatus sends the second indication information to the first communication apparatus.

According to the foregoing technical solution, the master AP calculates a time offset between the master AP and each coordinating AP based on a reference signal that comes from a terminal device and a reference signal reflected by the coordinating AP, and sends the time offset to each coordinating AP, so that each coordinating AP can pre-adjust a moment at which downlink data is to be sent. In this way, downlink data sent by the master AP and each coordinating AP can simultaneously arrive at the terminal device. Therefore, a processing capability of the terminal device can be simplified, and receiving performance of the terminal device can be improved.

With reference to the second aspect, in some implementations of the second aspect, the method further includes: The third communication apparatus sends third indication information to the second communication apparatus, where the third indication information is used to indicate information about the first communication apparatus.

According to the foregoing technical solution, before D-MIMO transmission, the master AP sends, to the terminal device, information about each coordinating AP that participates in the D-MIMO transmission, so that the terminal device implements more effective beam management and joint signal detection, thereby simplifying a processing capability of the terminal device.

With reference to the second aspect, in some implementations of the second aspect, the method further includes: The third communication apparatus sends fourth indication information to the second communication apparatus, where the fourth indication information is used to indicate configuration information of an uplink cyclic prefix CP, and the configuration information of the uplink CP is determined based on a path through which uplink data arrives at the third communication apparatus.

According to the foregoing technical solution, the master AP configures a dynamic uplink CP for the terminal device (namely, the second communication apparatus) based on a dynamically constructed uplink channel, so that uplink transmission efficiency can be improved.

According to a third aspect, a communication method is provided. The method may include:

A second communication apparatus receives fourth indication information from a third communication apparatus, where the fourth indication information is used to indicate configuration information of an uplink cyclic prefix CP, and the configuration information of the uplink CP is determined by the third communication apparatus based on a transmission delay between the second communication apparatus and a first communication apparatus and a transmission delay between the second communication apparatus and the third communication apparatus. The second communication apparatus sends data based on the configuration information of the uplink CP.

According to the foregoing technical solution, a master AP (namely, the third communication apparatus) configures a dynamic uplink CP for a terminal device (namely, the second communication apparatus) based on a dynamically constructed uplink channel, so that uplink transmission efficiency can be improved.

With reference to the third aspect, in some implementations of the third aspect, the method further includes:

The second communication apparatus sends a first reference signal to the first communication apparatus, where the first reference signal is used to determine a first time offset, the first time offset is a time offset of the first communication apparatus relative to the third communication apparatus, and the first time offset is used by the first communication apparatus to determine a moment at which data is to be sent to the second communication apparatus.

According to the foregoing technical solution, a coordinating AP calculates a time offset between the coordinating AP and the master AP (namely, the third communication apparatus) based on a reference signal that comes from the terminal device (namely, the second communication apparatus), so that each coordinating AP can pre-adjust a moment at which downlink data is to be sent. In this way, downlink data sent by the master AP and each coordinating AP can simultaneously arrive at the terminal device. Therefore, a processing capability of the terminal device can be simplified, and receiving performance of the terminal device can be improved.

According to a fourth aspect, a communication apparatus is provided, including modules or units configured to perform the method in any one of the first aspect or the possible implementations of the first aspect.

According to a fifth aspect, a communication apparatus is provided, including modules or units configured to perform the method in any one of the second aspect or the possible implementations of the second aspect.

According to a sixth aspect, a communication apparatus is provided, including modules or units configured to perform the method in any one of the third aspect or the possible implementations of the third aspect.

According to a seventh aspect, a communication apparatus is provided, and includes a processor. The processor is coupled to a memory, and may be configured to execute instructions in the memory, to implement the method in any one of the first aspect or the possible implementations of the first aspect. Optionally, the communication apparatus further includes the memory. Optionally, the communication apparatus further includes a communication interface, and the processor is coupled to the communication interface.

In an implementation, the communication apparatus is a first communication apparatus. When the communication apparatus is the first communication apparatus, the communication interface may be a transceiver or an input/output interface.

In another implementation, the communication apparatus is a chip configured in a first communication apparatus. When the communication apparatus is the chip configured in the first communication apparatus, the communication interface may be an input/output interface.

Optionally, the transceiver may be a transceiver circuit. Optionally, the input/output interface may be an input/output circuit.

According to an eighth aspect, a communication apparatus is provided, and includes a processor. The processor is coupled to a memory, and may be configured to execute instructions in the memory, to implement the method in any one of the second aspect or the possible implementations of the second aspect. Optionally, the communication apparatus further includes the memory. Optionally, the communication apparatus further includes a communication interface, and the processor is coupled to the communication interface.

In an implementation, the communication apparatus is a third communication apparatus. When the communication apparatus is the third communication apparatus, the communication interface may be a transceiver or an input/output interface.

In another implementation, the communication apparatus is a chip configured in a third communication apparatus. When the communication apparatus is the chip configured in the third communication apparatus, the communication interface may be an input/output interface.

Optionally, the transceiver may be a transceiver circuit. Optionally, the input/output interface may be an input/output circuit.

According to a ninth aspect, a communication apparatus is provided, and includes a processor. The processor is coupled to a memory, and may be configured to execute instructions in the memory, to implement the method in any one of the third aspect or the possible implementations of the third aspect. Optionally, the communication apparatus further includes the memory. Optionally, the communication apparatus further includes a communication interface, and the processor is coupled to the communication interface.

In an implementation, the communication apparatus is a second communication apparatus. When the communication apparatus is the second communication apparatus, the communication interface may be a transceiver or an input/output interface.

In another implementation, the communication apparatus is a chip configured in a second communication apparatus. When the communication apparatus is the chip configured in the second communication apparatus, the communication interface may be an input/output interface.

Optionally, the transceiver may be a transceiver circuit. Optionally, the input/output interface may be an input/output circuit.

According to a tenth aspect, a processor is provided, including an input circuit, an output circuit, and a processing circuit. The processing circuit is configured to receive a signal by using the input circuit, and transmit a signal by using the output circuit, so that the processor performs the method in any one of the possible implementations of the first aspect to the third aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this disclosure.

According to an eleventh aspect, a processing apparatus is provided, including a processor and a memory. The processor is configured to read instructions stored in the memory, and may receive a signal by using a receiver, and transmit a signal by using a transmitter, to perform the method in any one of the possible implementations of the first aspect to the third aspect.

Optionally, there are one or more processors, and there are one or more memories.

Optionally, the memory may be integrated into the processor, or the memory and the processor are separately disposed.

In a specific implementation process, the memory may be a non-transitory memory, for example, a read-only memory (ROM). The memory and the processor may be integrated into a same chip, or may be disposed on different chips. A type of the memory and a manner in which the memory and the processor are disposed are not limited in this embodiment.

It should be understood that, a related data exchange process such as sending of indication information may be a process of outputting the indication information from the processor, and receiving of capability information may be a process of receiving the input capability information by the processor. Data output by the processor may be output to a transmitter, and input data received by the processor may be from a receiver. The transmitter and the receiver may be collectively referred to as a transceiver.

The processing apparatus in the eleventh aspect may be one or more chips. The processor in the processing apparatus may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated in the processor, or may be located outside the processor and exist independently.

According to a twelfth aspect, a computer program product is provided. The computer program product includes a computer program (which may also be referred to as code or instructions). When the computer program is run, a computer is enabled to perform the method in any one of the possible implementations of the first aspect to the third aspect.

According to a thirteenth aspect, a computer-readable storage medium is provided. The computer-readable storage medium stores a computer program (which may also be referred to as code or instructions). When the computer program is run on a computer, the method in any one of the possible implementations of the first aspect to the third aspect is performed.

According to a fourteenth aspect, a communication system is provided, including the first communication apparatus, the second communication apparatus, and the third communication apparatus in the foregoing descriptions.

BRIEF DESCRIPTION OF DRAWINGS

FIG. 10 is a schematic diagram of a format of first indication information according to an embodiment;

9

Figures 16A, 16B, 17:
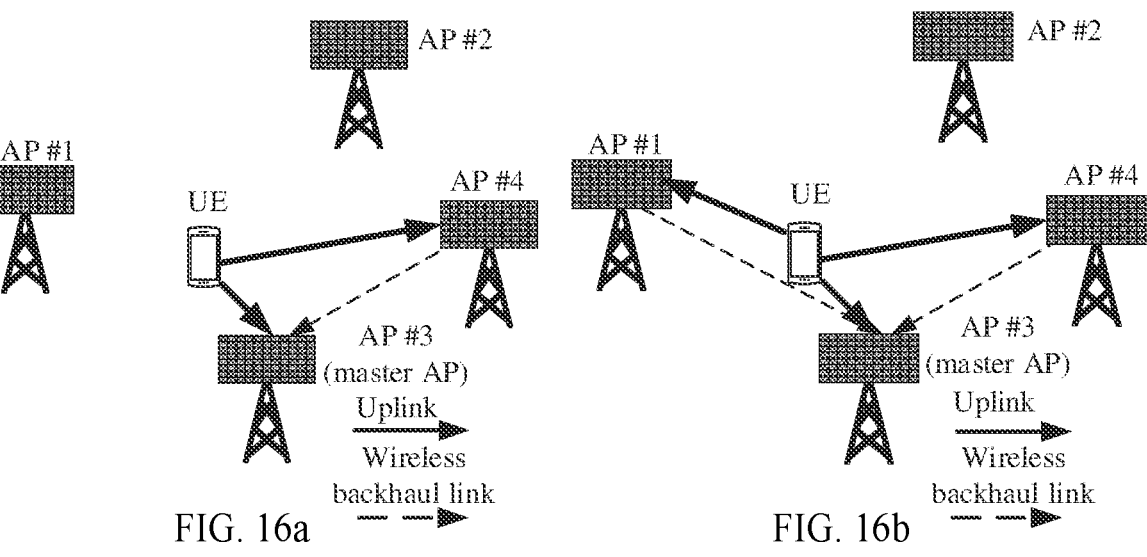
Figure 18:
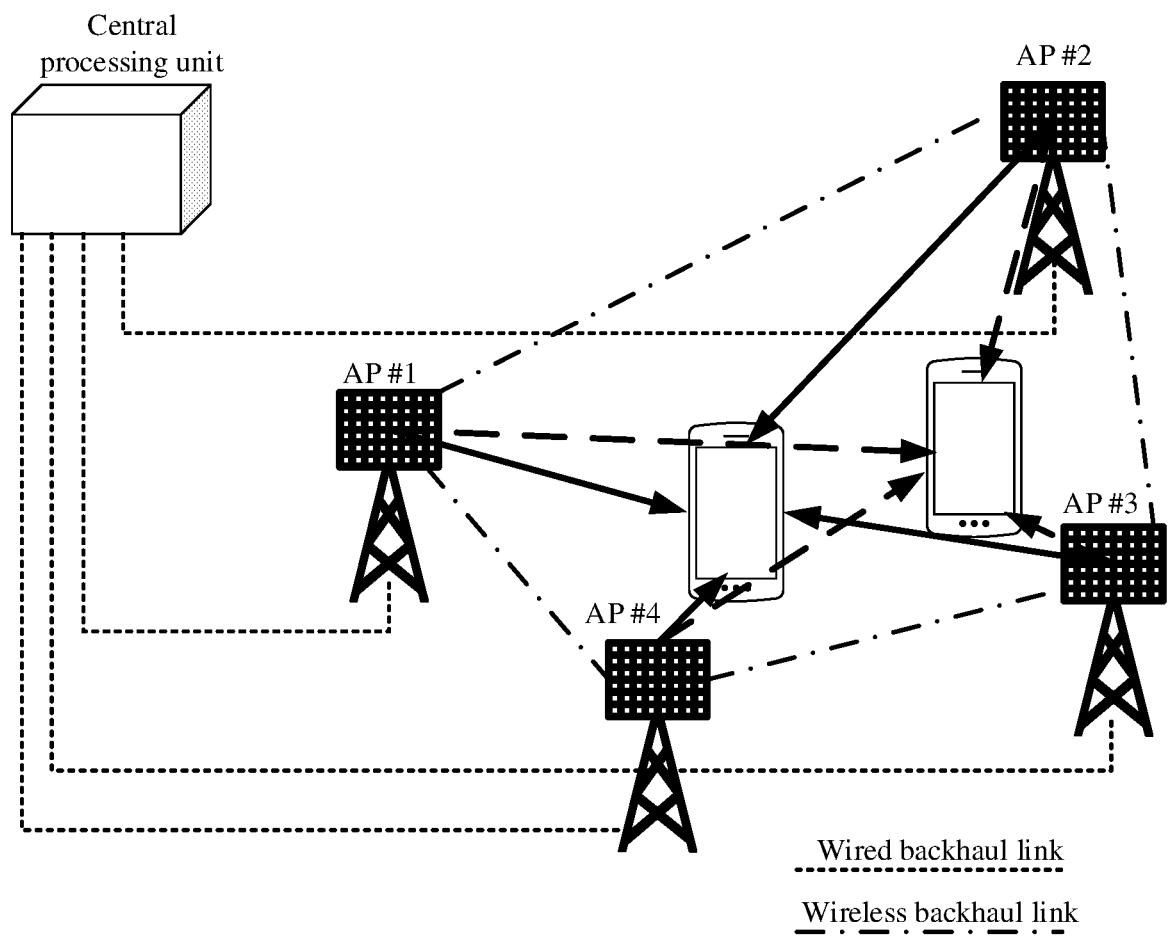
Figure 19:
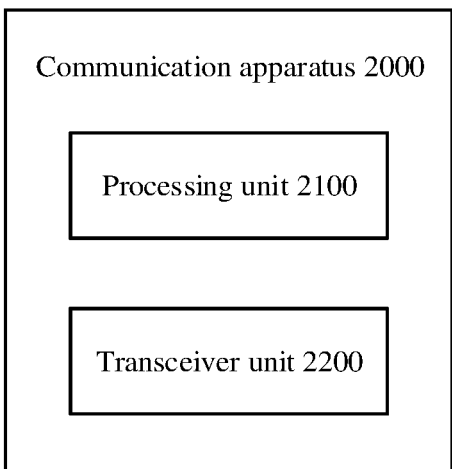
Figure 20:
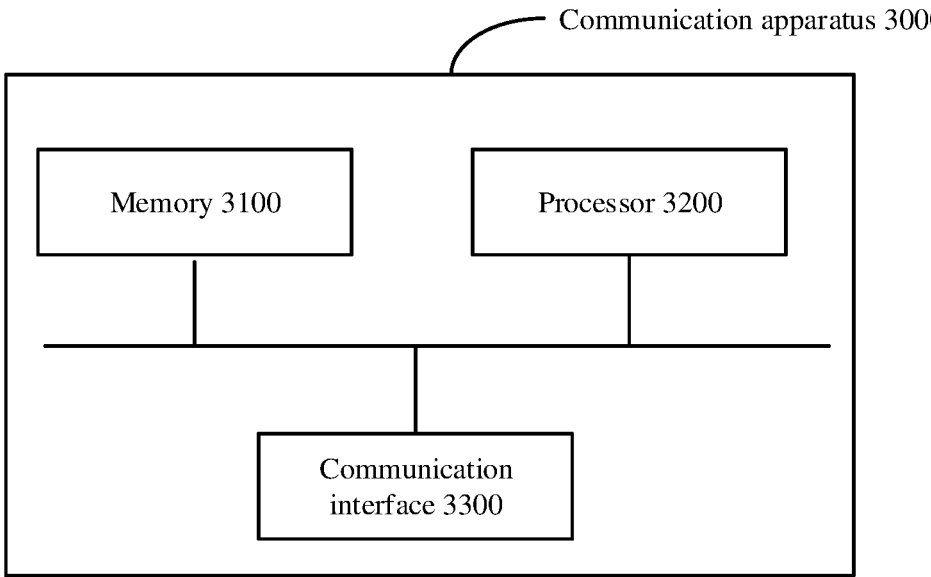
Figure 21:
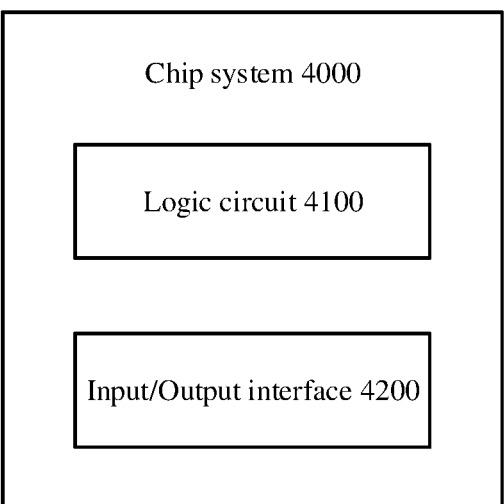

FIG. 11(*a*), 11(*b*), 11(*c*) and FIG. 12 are schematic diagrams of a manner of transmitting first indication information according to an embodiment;

FIG. 13 and FIG. 14 are schematic diagrams of a method for determining a time offset of a coordinating AP relative to a master AP according to an embodiment;

FIG. 15 and FIGS. 16(*a*) and 16(*b*) are schematic diagrams of a backhaul network established in an uplink transmission slot according to an embodiment;

FIG. 17 is a schematic diagram of a format of fourth indication information according to an embodiment;

FIG. 18 is a schematic diagram of a backhaul network according to an embodiment;

FIG. 19 is a schematic diagram of a communication apparatus according to an embodiment;

FIG. 20 is a schematic block diagram of a communication apparatus according to another embodiment; and FIG. 21 is a schematic diagram of a chip system according to an embodiment.

DESCRIPTION OF EMBODIMENTS

The following describes technical solutions with reference to the accompanying drawings.

The technical solutions in embodiments may be applied to various communication systems, for example, a long term evolution (LTE) system, an LTE frequency division duplex (FDD) system, LTE time division duplex (TDD) system, a universal mobile telecommunications system (UMTS), a worldwide interoperability for microwave access (WiMAX) communication system, a 5G mobile communication system, or a new radio (NR) system. The 5G mobile communication system may include a non-standalone (NSA) network and/or a standalone (SA) network.

The technical solutions in embodiments may be further applied to a non-terrestrial network (NTN) system, for example, a satellite communication system or high altitude platform station (HAPS) communication system, and various mobile communication systems integrated with the satellite communication system.

The technical solutions provided in this specification may be further applied to machine type communication (MTC), long term evolution-machine (LTE-M), a device-to-device (D2D) network, a machine-to-machine (M2M) network, an internet of things (IoT) network, or another network. The IoT network may include, for example, an internet of vehicles. Communication modes in an internet of vehicles system are collectively referred to as vehicle-to-X (V2X, where X may represent anything). For example, the V2X may include vehicle-to-vehicle (V2V) communication, vehicle-to-infrastructure (V2I) communication, vehicle-to-pedestrian (V2P) communication, or vehicle-to-network (V2N) communication.

In embodiments, a network device may be any device with a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), an AP in a wireless fidelity (Wi-Fi) system, a wireless relay node, a wireless backhaul node, a transmission point (TP), a transmission and reception point (TRP), or the like; or may be a gNB or a transmission point (a TRP or a TP) in a 5G system, for example, an NR system, or one antenna panel or a group of antenna panels (including a plurality of antenna panels) of a base station in a 5G system; or may be a network node that constitutes a gNB or a transmission point, for example, a BBU or a distributed unit (DU), or a base station in a future communication system.

In some deployments, the gNB may include a central unit (CU) and the DU. The gNB may further include an active antenna unit (AAU). The CU implements some functions of the gNB, and the DU implements some functions of the gNB. For example, the CU is responsible for processing a non-real-time protocol and service, and implementing functions of a radio resource control (RRC) layer and a packet data convergence protocol (PDCP) layer; and the DU is responsible for processing a physical layer protocol and a real-time service, and implementing functions of a radio link control (RLC) layer, a medium access control (MAC) layer, and a physical (PHY) layer. The AAU implements some physical layer processing functions, radio frequency processing, and a function related to an active antenna. Information at the RRC layer eventually becomes information at the PHY layer, or is converted from the information at the PHY layer. Therefore, in the example architecture, higher layer signaling such as RRC layer signaling or PHCP layer signaling may also be considered as being sent by the DU or sent by the DU and the AAU. It can be understood that the network device may be a device including one or more of a CU node, a DU node, and an AAU node. In addition, the CU may be classified into a network device in an access network (RAN), or the CU may be classified into a network device in a core network (CN). This is not limited in this specification.

The network device provides a service for a cell. A terminal device communicates with the cell by using a transmission resource (for example, a frequency domain resource, in other words, a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. These small cells have features of a small coverage area and a low transmit power, and are suitable for providing high-rate data transmission services.

The terminal device in embodiments may also be referred to as user equipment (UE), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, examples of some terminals may be a mobile phone, a tablet computer (pad), a computer with a wireless transceiver function (for example, a notebook computer or a palmtop computer), a mobile internet device (MID), a virtual reality (VR) device, an augmented reality (AR) device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, or a terminal device in a future evolved public land mobile network (PLMN).

The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device may be alternatively a terminal device in an internet of things (IoT) system. IoT is an important component of future information technology development. A main technical feature of the IoT is to connect an object to a network by using a communication technology, to implement an intelligent network of human-computer interconnection and thing-to-thing interconnection. In the IoT technology, massive connectivity, in-depth coverage, and power saving for a terminal can be achieved by using, for example, a narrowband (NB) technology.

In addition, the terminal device may further include an intelligent printer, a train detector, and a gas station, or the link. Main functions of the terminal device include collecting data (some terminal devices), receiving control information and downlink data from the network device, sending an electromagnetic wave, and transmitting uplink data to the network device.

Figure 1:
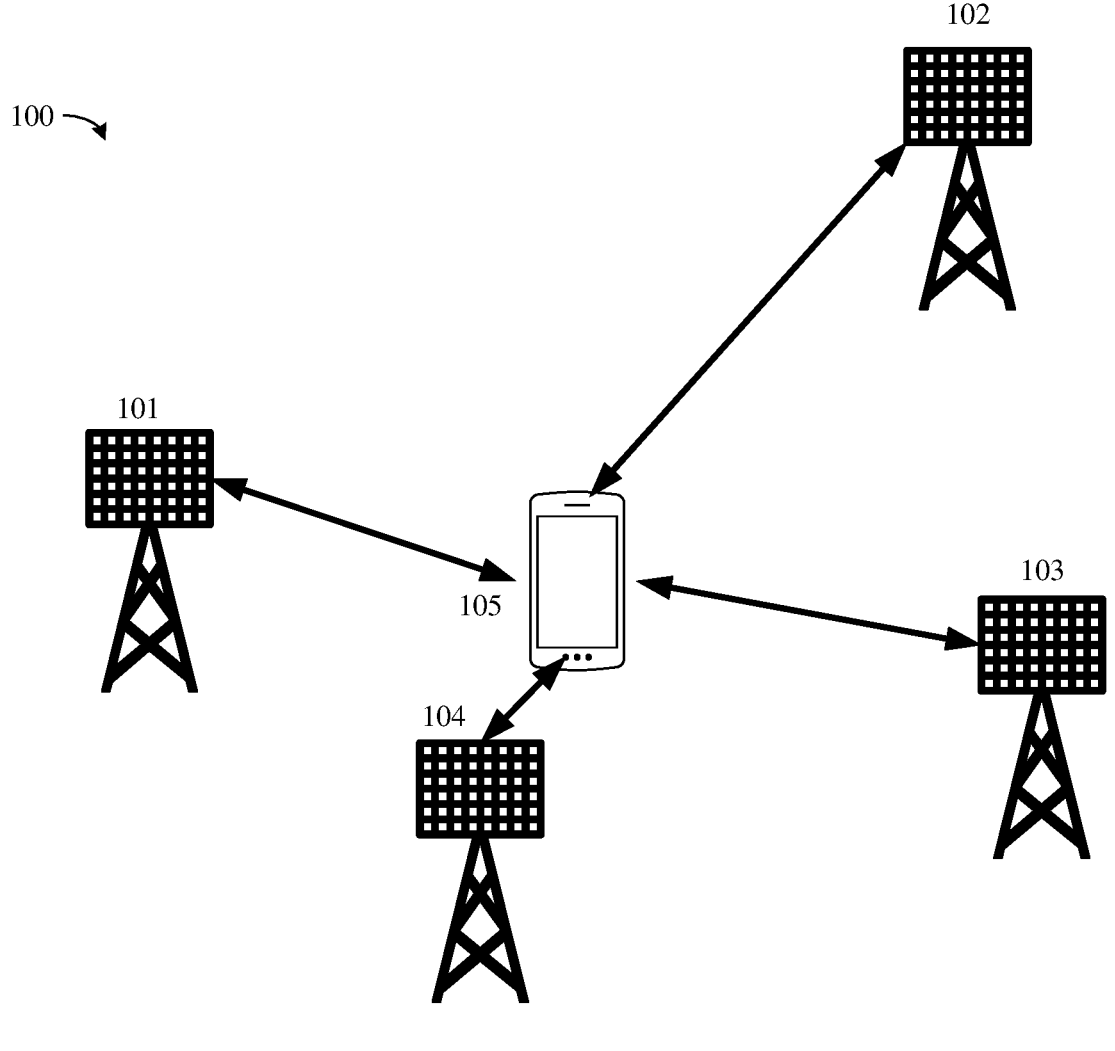
FIG. 1 is a schematic diagram of a communication system to which an embodiment is applicable.

For ease of understanding embodiments, first, a communication system to which a method provided in embodiments is applicable is described in detail with reference to FIG. 1. FIG. 1 is a schematic diagram of a communication system 100 to which a method provided in an embodiment is applicable. As shown in the figure, the communication system 100 may include at least two network devices, for example, network devices 101 to 104 in a 5G system shown in FIG. 1. The communication system 100 may further include at least one terminal device, for example, a terminal device 105 shown in FIG. 1. The terminal device 105 may be mobile or fixed. The terminal device 105 may communicate with one or more of the network devices 101 to 104 through a radio link. For example, the network device 101, 102, 103, 104 may send configuration information to the terminal device 105, and the terminal device may send uplink data to the network device based on the configuration information. As another example, the network device may send downlink data to the terminal device 105. Therefore, the network devices 101 to 104 and the terminal device 105 in FIG. 1 constitute a communication system.

Optionally, terminal devices may directly communicate with each other. For example, direct communication between terminal devices may be implemented by using a D2D technology.

It should be understood that FIG. 1 shows a plurality of network devices, one terminal device, and a communication links between communication devices as an example. Optionally, the communication system 100 may include more network devices and/or terminal devices. This is not limited in this specification.

The foregoing communication devices, for example, the network devices 101 to 104 and the terminal device 105 in FIG. 1, each may be equipped with a plurality of antennas. The antennas may include at least one transmit antenna configured to send a signal and at least one receive antenna configured to receive a signal. In addition, the communication devices each additionally include a transmitter chain and a receiver chain. A person of ordinary skill in the art will understand that the transmitter chain and the receiver chain each may include a plurality of components (for example, a processor, a modulator, a multiplexer, a demodulator, a demultiplexer, or an antenna) related to signal sending and receiving. Therefore, the network device may communicate with the terminal device by using a multiple-antenna technology.

Optionally, the communication system 100 may further include another network entity, for example, a network controller or a mobility management entity. This is not limited in this embodiment.

Figure 2:
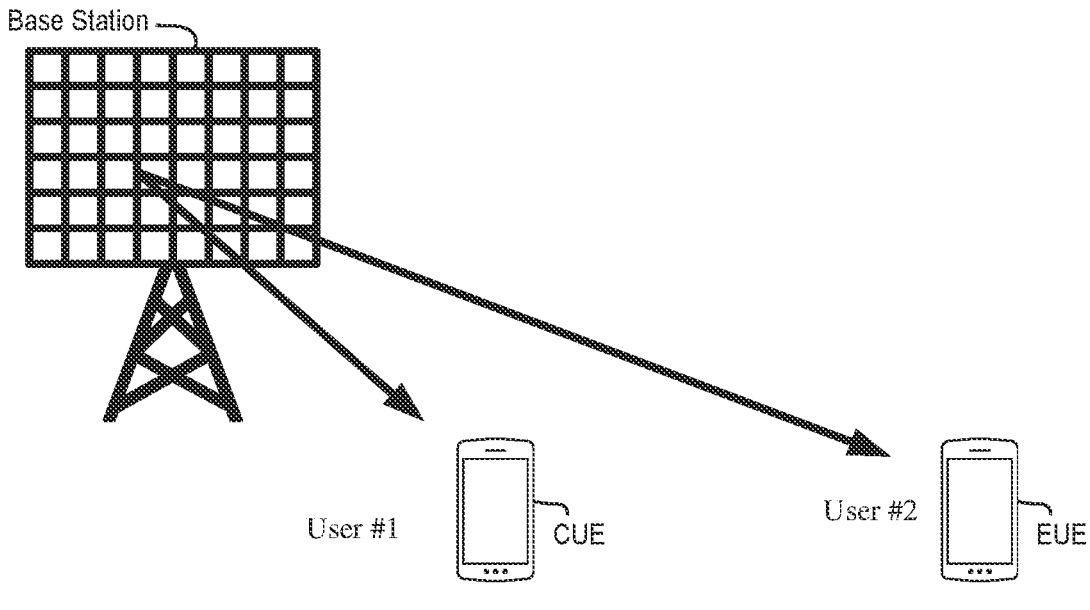
FIG. 2 shows an example of a centralized MIMO antenna system.

In a 5G system, a massive MIMO antenna system is introduced on a base station side, as shown in FIG. 2. The massive MIMO antenna system deployed on the base station side provides a quite strong (large) signal processing capability for a communication system, thereby greatly increasing a peak rate of the communication system and improving a capability of suppressing cell interference. More importantly, the massive MIMO antenna system can provide a spatial multiplexing solution-based transmission mode simultaneously for a plurality of users, thereby reducing an access waiting time for a plurality of users in the communication system, and increasing a service experience rate for each of the users. In a cell covered by a centralized massive MIMO system, if different users are at different locations, quality of channels from the users to a base station varies greatly. As shown in FIG. 2, quality of a channel between a user #1 close to a base station (which may be referred to as a cell center user (CUE)) and the base station is much better than quality of a channel between a user #2 (which may be referred to as a cell edge user (EUE)) and the base station. Therefore, service experience rates of the CUE and the EUE vary greatly, and quality of service that is provided or service content that can be provided by the base station for the CUE and the EUE varies greatly. When a user moves, for example, when the user #1 moves from a current location to a location of the user #2, a user state of the user #1 changes from the CUE to the EUE, and a service provided by the base station for the user #1 that moves would have to be interrupted, or quality of service has to be degraded. As a result, service experience of the user #1 becomes quite poor.

Figure 3:
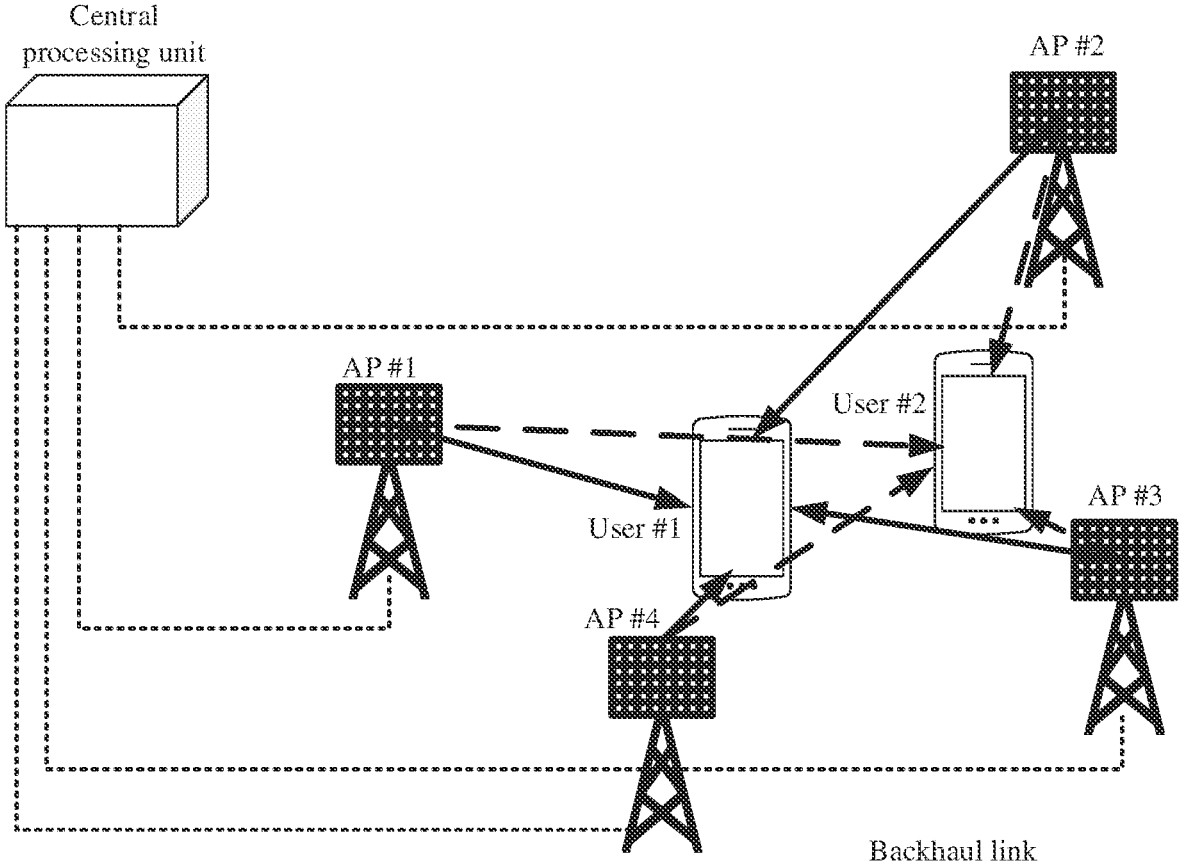
FIG. 3 and FIG. 4 show examples of distributed MIMO antenna systems.
Figure 4:
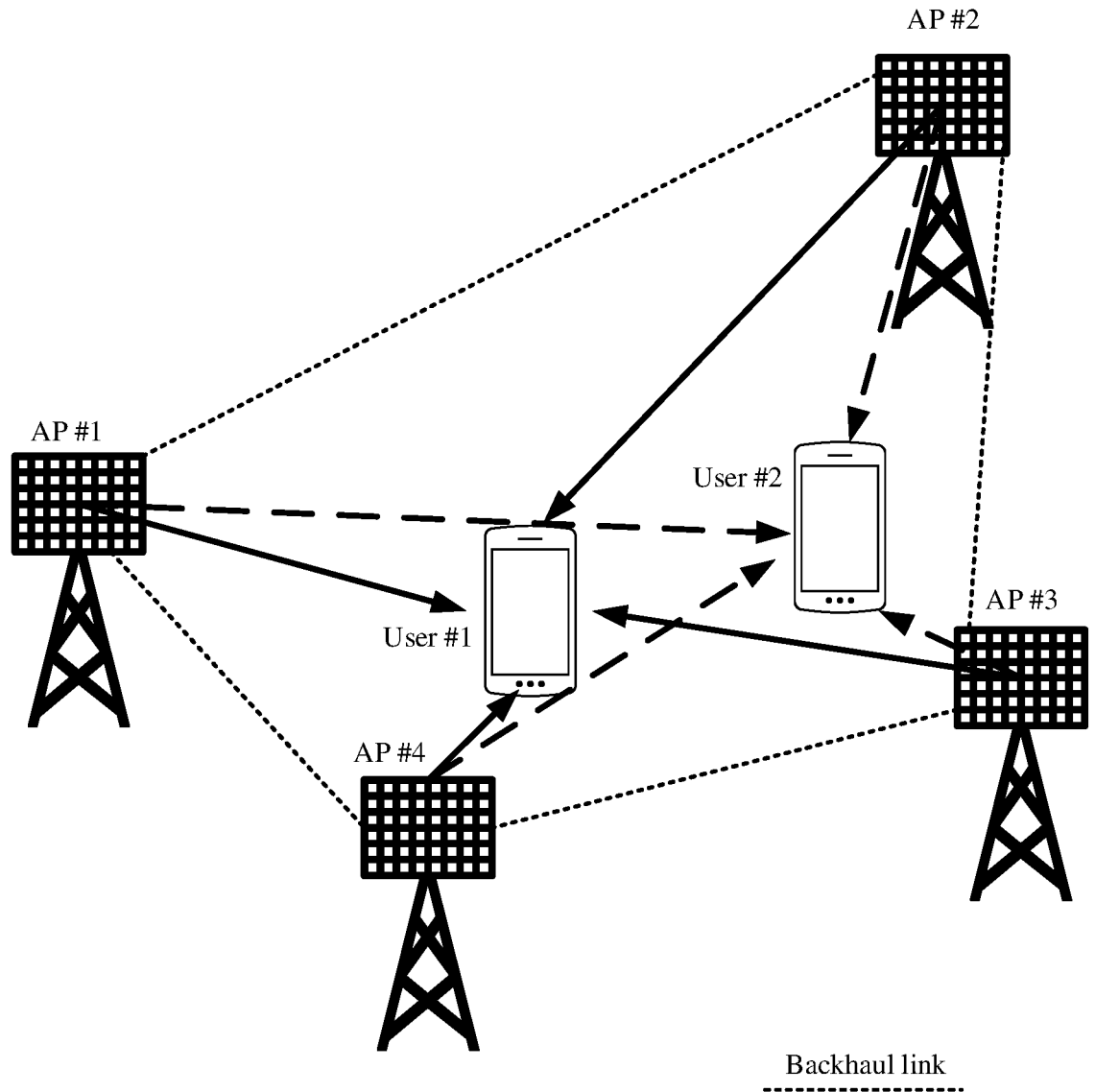

To achieve better user experience performance for all users within a coverage area of a cell or a user moving within a cell, a transmission architecture based on a centralized massive MIMO base station evolves into a distributed massive MIMO system architecture. The distributed massive MIMO system architecture is shown in FIG. 3 or FIG. 4. In the distributed massive MIMO system architecture, a cell is served jointly by a plurality of APs each equipped with a massive MIMO antenna system (or a plurality of small base stations that have a small coverage area and that are densely deployed). A user in a cell may be served simultaneously by a plurality of APs. For users at different geographical locations, a central processing unit may select all APs or some APs (a selected AP set is referred to as a coordinating cluster) that serve the cell to serve different users. A plurality of APs that serve a user may be connected to each other through a wired or wireless backhaul network, and share control information or data. Resources used by users may also be allocated and scheduled by the central processing unit. The central processing unit may be a logical unit or a physical unit. The central processing unit may be a separate module, or may be an AP, for example, an AP closest to a user.

The distributed massive MIMO system architecture has the following advantages:

(1) Performance of a user in a cell is high, and performance of a user at different locations in a cell is uniform, so that user experience of performance is good.

(2) The central processing unit can select an optimal AP set for a user, so that efficiency of transmitting data and receiving data by the user is high.

(3) For a user equipped with a plurality of antenna subarrays, data streams can be received and transmitted at a higher rate.

(4) With reference to uplink and downlink transmission service requirements of a user, the central processing unit can implement an asymmetric uplink/downlink efficient coordinated transmission mechanism.

Theoretically, the distributed massive MIMO system can create a quite large performance gain for a wireless transmission system. However, there are many challenges in practical deployment. In the distributed massive MIMO system, system performance depends on coordination between a plurality of APs, and the coordination between the plurality of APs is to share information through a backhaul network established between the plurality of APs. Therefore, performance of the distributed mass MIMO system heavily relies on quality of the backhaul network established between the plurality of APs.

For example, FIG. 3 shows an example of connecting AP nodes through a wired backhaul network (which may also be referred to as a fixed backhaul network). In a new D-MIMO transmission solution supported in the 5G standard, APs may separately transmit different data streams to a user, to increase a real-time data throughput of the user. For example, in FIG. 3, an AP #1 and an AP #2 transmit the same data streams to a user #1, and an AP #3 and an AP #4 transmit different data streams to the user #1. During data transmission, APs share scheduling information and resource allocation information through a backhaul network, and a control instruction may be delivered by a master AP (for example, the AP #4) to the user #1. Because APs may not share channel information or data through a backhaul network during data transmission, the new D-MIMO transmission solution currently supported in the 5G standard has a low requirement on a capacity of a backhaul network. However, because a fixed backhaul network has a large delay variation and performance of backhaul networks of different operators varies greatly, the new D-MIMO transmission solution supported in the 5G standard also encounters a great challenge in deployment in a practical system.

The D-MIMO transmission solution in the 5G standard can support a backward compatibility mode (for example, support the 4G standard). To be specific, all APs perform diversity mode—based data transmission for a user by using a same time-frequency resource. This data transmission solution requires that APs share channel information and data information through a backhaul network in a timely manner. Therefore, a higher requirement is imposed on a delay of a backhaul network.

For another example, FIG. 4 shows an example of connecting AP nodes through a wireless backhaul network. To be specific, a backhaul network between APs is implemented by using a radio air interface (for example, through time division, frequency division, or space division). With the wireless backhaul network, flexibility of 5G D-MIMO deployment can be greatly improved. However, for coordination between a plurality of APs, more system resources such as time, frequency, and space resources are required for establishing a wireless backhaul link and sharing data. The wireless backhaul network has a large delay, system transmission efficiency is reduced, and complexity of processing between base stations is high.

Downlink multi-AP coordinated transmission is used as an example. It may be assumed that data to be sent to a user has been distributed to APs through higher-layer processing, to reduce a requirement of coordinated transmission on a real-time capacity of a backhaul network. Before transmission, each AP needs to perform the following steps:

(1) Synchronous precoding and transmission of data: Regardless of whether a precoding matrix or a precoding vector is based on a joint design and distribution of a central processing unit or is based on an independent design of each AP, during data transmission, each AP processes data by using its own precoder before transmitting the data to a user, to ensure enhancement of a channel gain and suppression of interference in a coordinated transmission mode.

(2) Relative phase correction in precoding: If a transmission mechanism used for a user is a distributed precoding and diversity transmission solution, relative phase correction is completed for a precoding vector or a precoding matrix of each AP, to ensure that a high diversity transmission gain can be obtained in real time.

However, for the fixed backhaul network, although a network capacity of the fixed backhaul network is large, a delay variation of the fixed backhaul network is large; for the wireless backhaul network, although a backhaul delay may be fixed in a point-to-point scenario, a delay of the wireless backhaul network is large in a multi-AP scenario, and the wireless backhaul network uses system resources, reducing system transmission efficiency. Therefore, neither the fixed backhaul network nor the wireless backhaul network can meet the foregoing requirements. In addition, a problem of beam state alignment between a plurality of APs, a transmission beamforming vector, or phase alignment between matrices is not resolved in current D-MIMO transmission solutions.

In view of this, when a new antenna array is introduced, embodiments provide a method for establishing a backhaul network, to implement a flexible and high-performance D-MIMO transmission solution.

For ease of understanding embodiments, the following first describes the new antenna array introduced in embodiments.

Currently, research in new electromagnetic metasurface antenna array technologies has achieved great progress. People attempt to design a massive MIMO antenna system by using these new electromagnetic metasurface antenna arrays, to simplify a structure of an antenna array of a base station and increase a power of a transmitter.

An electromagnetic metasurface antenna array is an artificial composite material including a series of artificial unit structures with sub-wavelength sizes (a length of a unit ranges from $\frac{1}{10}$ of a wavelength to $\frac{1}{2}$ of a wavelength). These units interact with electromagnetic waves in a specific manner, have unique electromagnetic properties different from those of natural materials, and may lead to unconventional physical phenomena such as negative refraction, perfect lenses, and electromagnetic stealth. There are many electromagnetic metasurface/structures, and manners of controlling parameters of incident electromagnetic waves by electromagnetic metasurfaces are also different.

Figure 5:
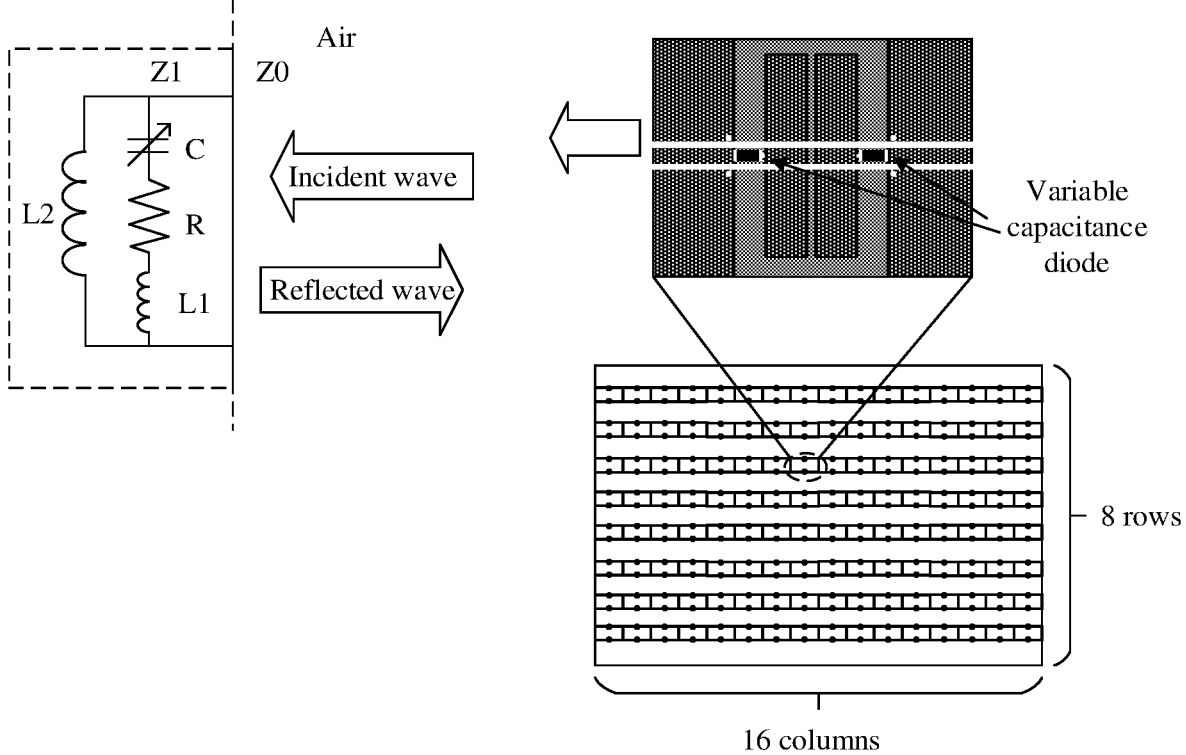
FIG. 5 is a schematic diagram of a structure of a single atom of a new electromagnetic metasurface.

FIG. 5 is a schematic diagram of an example structure of a single atom or instance of a new electromagnetic metasurface. An electromagnetic metasurface antenna array unit shown in FIG. 5 includes a specific circuit structure (for example, a variable capacitance diode circuit), and a capacitance on the unit is controlled to change equivalent impedance $Z_1$ of the unit. In this case, a reflection coefficient $\Gamma$ used when an electromagnetic wave passes through the metasurface antenna array unit may be expressed as follows:

$$\Gamma = \frac{Z_1 - Z_0}{Z_1 + Z_0} = Ae^{j\varphi}, \tag{1}$$

where $Z_0$ is air impedance and is a constant, radiation and a phase of a reflected electromagnetic wave may be controlled by adjusting the impedance $Z_1$, A is amplitude information of the reflection coefficient $\Gamma$, and $\varphi$ is phase information of the reflection coefficient $\Gamma$.

Compared with a conventional metasurface array in which a fixed reflection coefficient is used, in the new metasurface array, electromagnetic parameters, such as amplitude and phase information of a reflection coefficient or a transmission coefficient, of a unit can be dynamically changed under the control of a program, to implement electromagnetic wave adjustment of various functions through encoding.

There are many types of new controllable electromagnetic metasurface structures. However, a basic design criterion is that an amplitude of a reflection coefficient of a unit is controlled to remain constant, and a phase of the reflection coefficient is changed by changing impedance. Then adjustment of parameters of an incident electromagnetic wave and transmission of a modulated electromagnetic wave are simultaneously completed based on a relationship between an incident wave S, the reflection coefficient $\Gamma$, and a reflected wave R:

$$R = \Gamma S \tag{2}$$

As shown in FIG. 5, it has been proved in theoretical research and experiments that, a plurality of manners of processing an incident electromagnetic wave can be implemented by changing a capacitance of a variable capacitor in a circuit in different control manners.

(1) Continuous phase adjustment for received signals: An electromagnetic metasurface antenna array does not transmit a signal, but only modulates a received signal. Therefore, power consumption of this type of transmitter is quite low. In addition, a transmitter based on an electromagnetic metasurface antenna array has a simplified hardware architecture and control mode. Therefore, the electromagnetic metasurface antenna array becomes one of hot technologies in research and designs of new transmitters.

(2) Full absorption of electromagnetic waves: When special control is performed on a variable capacitance within a time period, an electromagnetic metasurface can fully absorb an incident electromagnetic wave, thereby effectively increasing energy of a received signal, and further reducing a transmit power of a user.

(3) For a massive electromagnetic metasurface antenna array, reception and directional transmission of incident electromagnetic waves can be simultaneously implemented by controlling different atoms or different atom sets in the electromagnetic metasurface antenna array.

Therefore, if an electromagnetic metasurface—based massive MIMO antenna system is used in a radio access system, higher signal sending/receiving efficiency and a more flexible MIMO deployment mode can be implemented.

The following describes a method for establishing a backhaul network in embodiments with reference to accompanying drawings.

It should be understood that interaction between a first communication apparatus, a second communication apparatus, and a third communication apparatus is used as an example below to describe in detail the method provided in embodiments merely for ease of understanding and description. However, this should not be construed as a limitation on an entity for performing any method provided in this specification. For example, the first communication apparatus shown in the following embodiments may be replaced with a component (for example, a chip or a chip system) configured in the first communication apparatus, the second communication apparatus shown in the following embodiments may be replaced with a component (for example, a chip or a chip system) configured in the second communication apparatus, and the third communication apparatus shown in the following embodiments may be replaced with a component (for example, a chip or a chip system) configured in the third communication apparatus.

A specific structure of an entity for performing the method provided in embodiments is not particularly limited in the following embodiments, provided that the entity is capable of running a program that records code of the method provided in embodiments to perform communication according to the method provided in embodiments. For example, the entity for performing the method provided in embodiments may be a communication apparatus, or a functional module that is in a communication apparatus and that is capable of invoking the program and executing the program.

Figure 6:
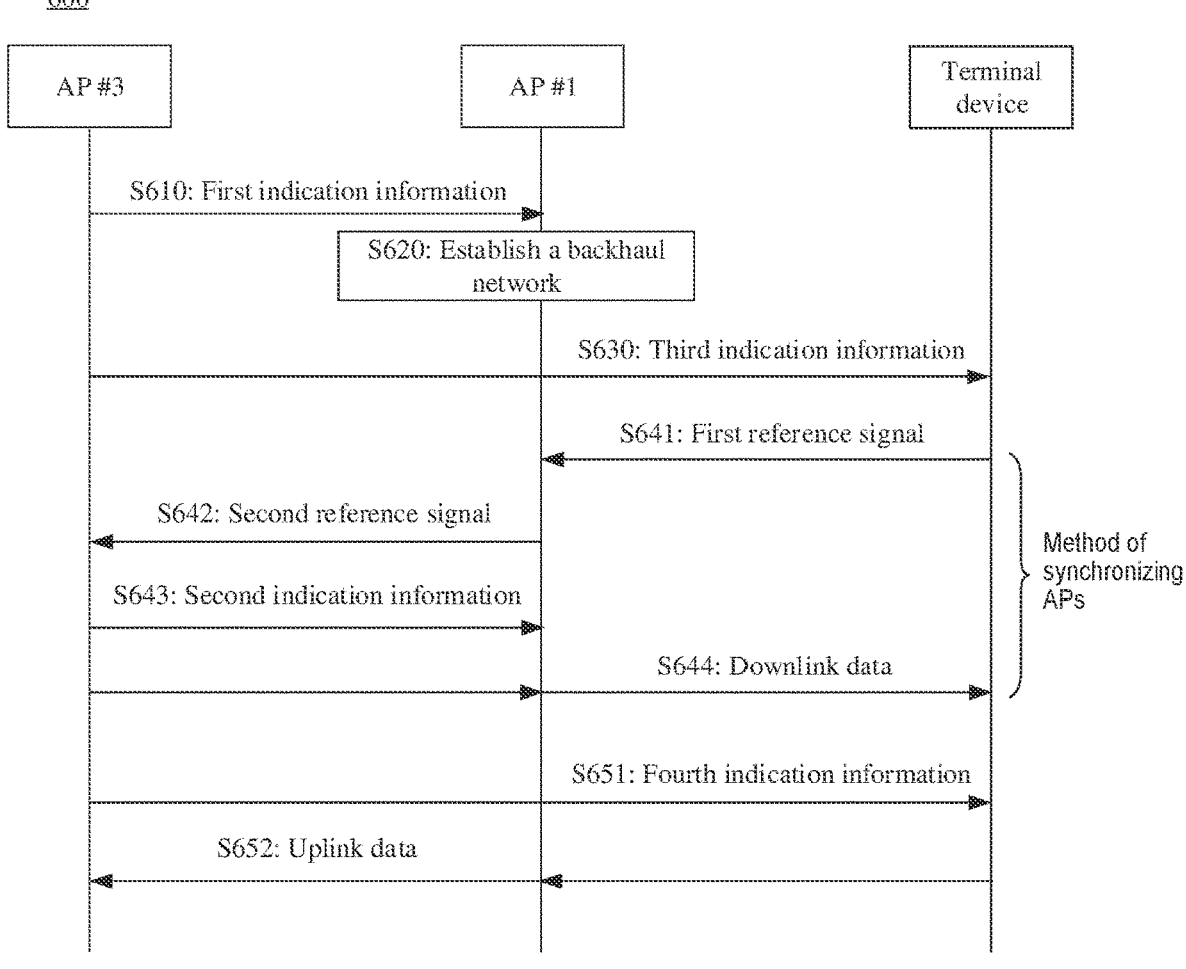
FIG. 6 is a schematic flowchart of a method for establishing a backhaul network according to an embodiment.

FIG. 6 is a schematic flowchart of a method 600 for establishing a backhaul network according to an embodiment from a perspective of device interaction. Steps of the method 600 shown in FIG. 6 are described in detail below.

S610: A first communication apparatus (AP #1) receives first indication information. Correspondingly, in S610, a third communication apparatus (AP #3) sends the first indication information.

The first communication apparatus may be a network device, for example, may be an AP. An example in which the first communication apparatus is an AP #1 is used below for description. The AP #1 may be a coordinating AP in multi-AP coordinated transmission.

The AP #1 may include a first antenna array such as an electromagnetic metasurface antenna array.

Optionally, the AP #1 may further include a second antenna array such as a conventional antenna array, namely, a non-electromagnetic metasurface antenna array.

Figures 7A, 7B:
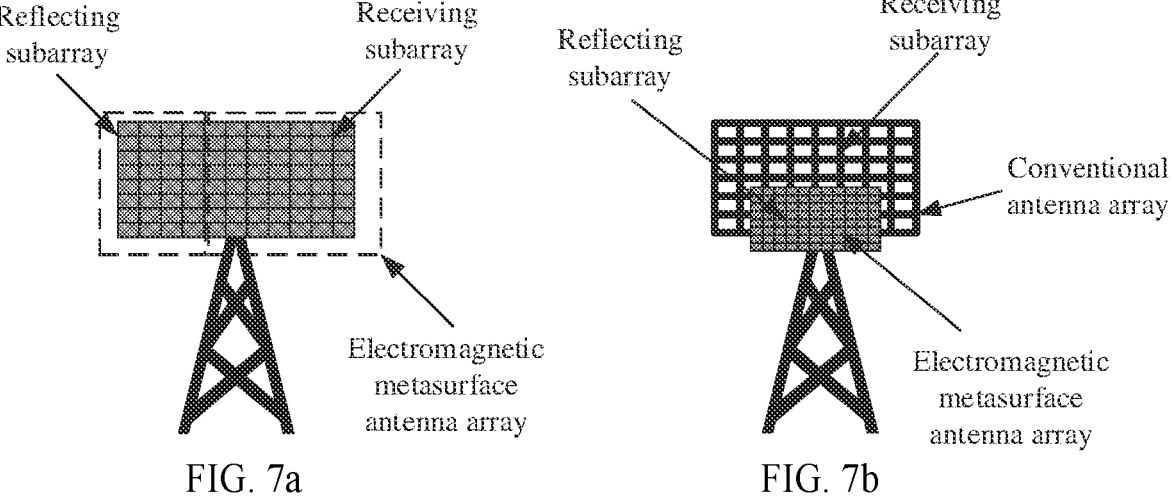
FIG. 7(a) and FIG. 7(b) are schematic diagrams of electromagnetic metasurface-based antenna systems according to an embodiment.

In an example, as shown in FIG. 7(a), the AP #1 includes a full electromagnetic metasurface antenna array, that is, the AP #1 may include only an electromagnetic metasurface antenna array. In this case, the electromagnetic metasurface antenna array may include a receiving subarray and a reflecting subarray. The receiving subarray is configured to receive data, and the reflecting subarray is configured to send data or reflect received data. The receiving subarray and the reflecting subarray may be physically divided, that is, the receiving subarray and the reflecting subarray are two separate antenna subarrays; or the receiving subarray and the reflecting subarray may be logically divided, that is, one part of the antenna array is a receiving subarray, and the other part is a reflecting subarray.

When the receiving subarray and the reflecting subarray are logically divided, the electromagnetic metasurface antenna array may be dynamically divided into the receiving subarray and the reflecting subarray based on a service traffic status and according to a requirement of a backhaul network. For example, if more data is received by the electromagnetic metasurface antenna array than is sent by the electromagnetic metasurface antenna array, the electromagnetic metasurface antenna array may be divided in such a way that an area of the receiving subarray is larger than an area of the reflecting subarray. In another example, if less data is received by the electromagnetic metasurface antenna array than is sent by the electromagnetic metasurface antenna array, the electromagnetic metasurface antenna array may be divided in such a way that an area of the receiving subarray is smaller than an area of the reflecting subarray.

In another example, as shown in FIG. 7(b), the AP #1 includes a hybrid electromagnetic metasurface antenna array, that is, the AP #1 may include an electromagnetic metasurface antenna array and a conventional antenna array. The conventional antenna array may serve as a receiving subarray, and the electromagnetic metasurface antenna array may serve as a reflecting subarray.

The third communication apparatus may be a network device, for example, an AP. An example in which the third communication apparatus is an AP #3 is used below for description. The AP #3 may be a master AP in multi-AP coordinated transmission, for example, an AP closest to a terminal device. The AP #3 may include a first antenna array and/or a second antenna array.

The first indication information is used to determine an operating mode and/or operating configuration information of the AP #1 in a backhaul network. The operating mode of the AP #1 in the backhaul network includes one or more of the following: participating in data transmission through a fixed backhaul network, participating in data transmission through a first wireless backhaul network, and participating in data transmission through a second wireless backhaul network. The first wireless backhaul network is a conventional wireless backhaul network. The second wireless backhaul network is a new wireless backhaul network. To be specific, the AP #1 used to establish the second wireless backhaul network includes an electromagnetic metasurface antenna array. The data transmission may be D-MIMO transmission. To be specific, a plurality of APs collaboratively transmit data. The data transmission includes uplink data transmission and/or downlink data transmission.

The participating in data transmission through a fixed backhaul network may be understood as follows: The AP #1 shares information or data with another AP through the fixed backhaul network, and the AP #1 participates in data transmission with a user, for example, participates in uplink data transmission and/or downlink data transmission.

Operating configuration information corresponding to the fixed backhaul network may include at least one of the following: a transmission capacity and a delay variation range. For definitions and explanations of the transmission capacity and the delay variation range, refer to a conventional technology or an existing standard.

The participating in data transmission through a first wireless backhaul network may be understood as follows: The AP #1 shares information or data with another AP through the first wireless backhaul network, and the AP #1 participates in data transmission with a user, for example, participates in uplink data transmission and/or downlink data transmission.

Operating configuration information corresponding to the first wireless backhaul network may include at least one of the following: time domain resource configuration information, frequency domain resource configuration information, space domain resource configuration information, and data transmission sequence information. For definitions and explanations of the time domain, frequency domain, and space domain resource configuration information, refer to a conventional technology or an existing standard. The data transmission sequence information is a sequence of transmitting information between APs. For example, assuming that the AP #1, an AP #2, and the AP #3 participate in data transmission through the first wireless backhaul network, where the AP #3 is a master AP, the data transmission sequence information may be a sequence of sending data by the AP #1 and the AP #2 to the AP #3. For example, the AP #1 sends data to the AP #3 at a moment t1, and the AP #2 sends data to the AP #3 at a moment t2, where the moment t1 is earlier than the moment t2.

The participating in data transmission through a second wireless backhaul network may be understood as follows: The AP #1 shares information or data with another AP through the second wireless backhaul network, and the AP #1 participates in data transmission with a user, for example, participates in uplink data transmission and/or downlink data transmission.

Operating configuration information corresponding to the second wireless backhaul network includes at least one of the following: a time at which the second wireless backhaul network is established, a transmission object, a transmission waveform, and a modulation scheme.

The time at which the second wireless backhaul network is established may include a time at which a reflecting subarray is enabled.

As shown in FIG. 8, a reflecting subarray of an electromagnetic metasurface antenna array has several controllable operating modes.

Figures 8A, 8B, 8C:
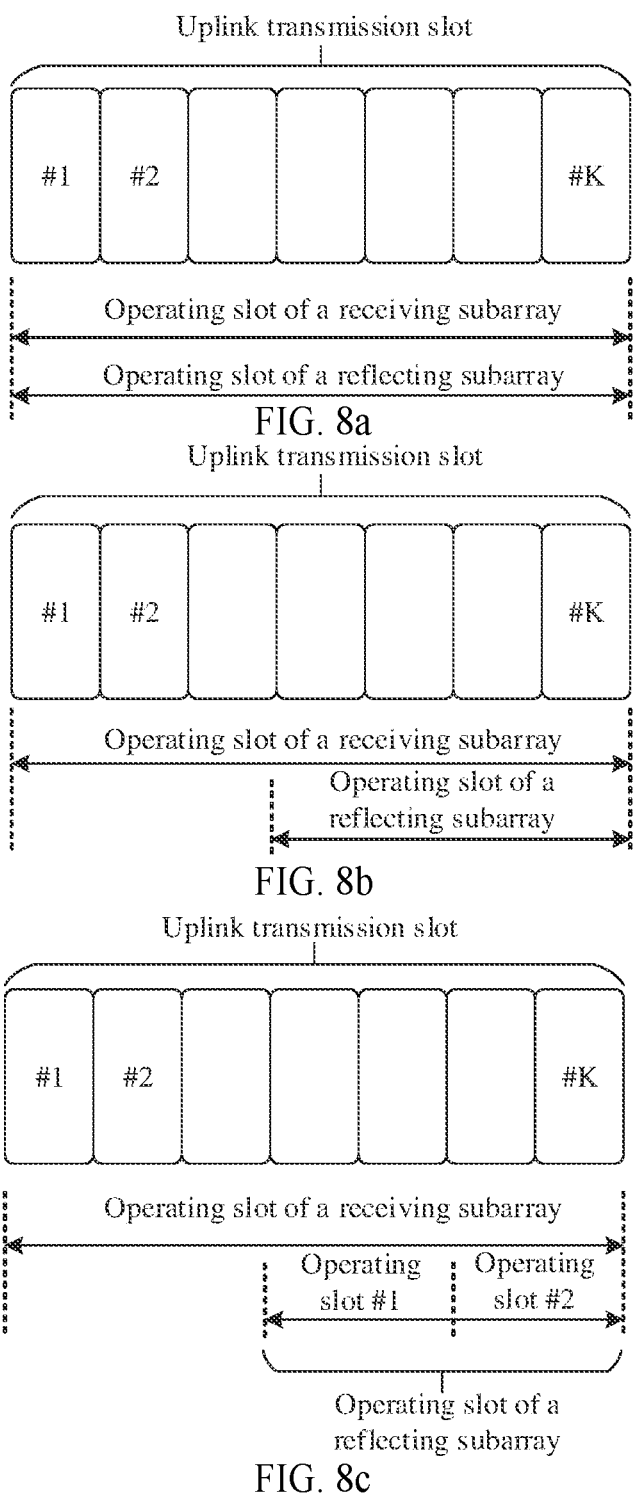
FIGS. 8(a), 8(b), and 8(c) are schematic diagrams of operating modes of an electromagnetic metasurface antenna array according to an embodiment.

(1) As shown in FIG. 8(a), a reflecting subarray and a receiving subarray operate simultaneously. To be specific, the receiving subarray and the reflecting subarray simultaneously operate in an entire uplink transmission slot. In the entire uplink transmission slot, the reflecting subarray may adjust and reflect an uplink signal, where the uplink signal may be a common reference signal used to construct a backhaul network, or the uplink signal may be a carrier signal, and the receiving subarray may receive and demodulate the uplink signal, to receive uplink data.

(2) As shown in FIG. 8(b), a reflecting subarray and a receiving subarray operate asynchronously. To flexibly control an operating mode of each AP, an operating mode in which a receiving subarray and a reflecting subarray are non-synchronized may be used. To be specific, before the reflecting subarray operates, the receiving subarray first receives a control signal used for the reflecting subarray, and then each AP enables the reflecting subarray in a specified slot.

Optionally, the operating mode in which a receiving subarray and a reflecting subarray are non-synchronized may be further simplified. As shown in FIG. 8(c), a plurality of APs may establish the second wireless backhaul network and share information by using a plurality of slots in a time division manner. For example, a reflecting subarray of an AP #1 may be enabled and operate in an operating slot #1, and a reflecting subarray of an AP #2 (another coordinating AP) may be enabled and operate in an operating slot #2.

It should be understood that the operating configuration information corresponding to the second wireless backhaul network may include detailed configuration information of an operating slot and an operating mode of a reflecting subarray of an AP. A dynamic second wireless backhaul network may be established based on an operating slot configured for a reflecting subarray of each AP. In other words, a dynamic second wireless backhaul network may be established in an uplink transmission slot based on an operating slot configured for a reflecting subarray of each AP.

The transmission object is data reflected by the reflecting subarray.

Figures 9A, 9B:
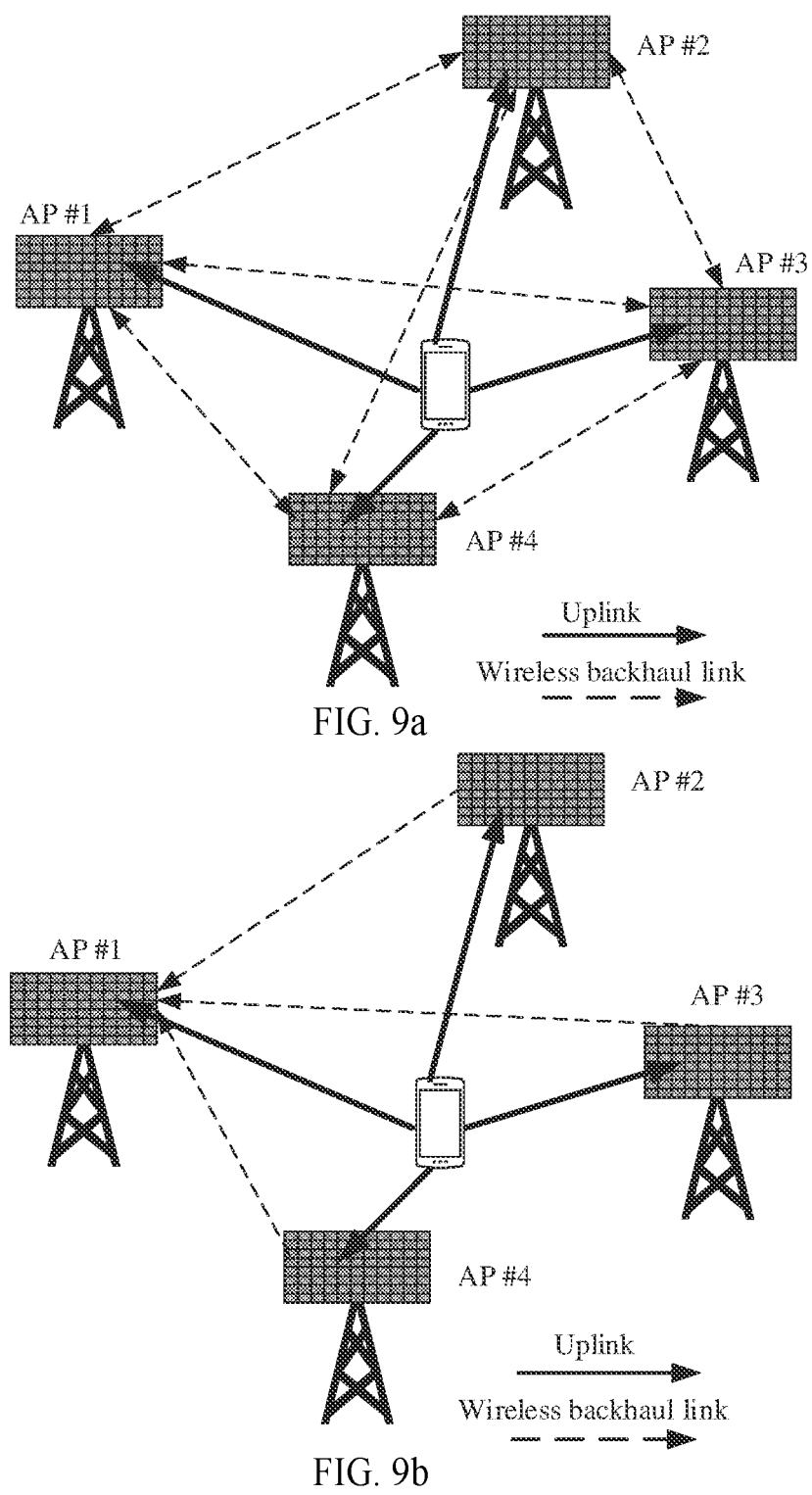
FIGS. 9(a) and 9(b) are schematic diagrams of topologies of a wireless backhaul network according to an embodiment.

For example, as shown in FIG. 9(a), APs that participate in multi-AP coordinated transmission may transmit data to each other. To be specific, after each AP receives an uplink signal from a terminal device, a reflecting subarray of each AP may perform adjustment or waveform conversion on the uplink signal, and transmit a processed uplink signal to each AP. For example, in FIG. 9(a), after receiving an uplink signal from the terminal device, an AP #1 may reflect the received uplink signal to an AP #2 to an AP #4; after receiving an uplink signal from the terminal device, the AP #2 may reflect the received uplink signal to the AP #1, the AP #3, and the AP #4; after receiving an uplink signal from the terminal device, the AP #3 may reflect the received uplink signal to the AP #1, the AP #2, and the AP #4; and after receiving an uplink signal from the terminal device, the AP #4 may reflect the received uplink signal to the AP #1 and to the AP #3. Optionally, each AP may transmit status information of the AP in a process of reflecting data.

A topology of the second wireless backhaul network shown in FIG. 9(a) is an optimal and most robust dynamic backhaul network topology. Considering complexity of processing signals by APs during establishment of a dynamic backhaul network, a directional wireless backhaul network topology shown in FIG. 9(b) may be selected.

As shown in FIG. 9(b), APs that participate in multi-AP coordinated transmission may transmit data in a directional manner. To be specific, after each AP receives an uplink signal from a terminal device, a reflecting subarray of each AP may perform adjustment or waveform conversion on the uplink signal, and transmit a processed uplink signal to a specific AP in a directional manner. For example, in FIG. 9(b), after an AP #1 to an AP #4 receive uplink signals from the terminal device, the AP #2 to the AP #4 reflect the received signals to the AP #1. Optionally, each AP may transmit status information of the AP in a process of reflecting data.

Optionally, the operating mode of the AP #1 in the backhaul network may be a plurality of the foregoing operating modes. For example, the participation of AP #1 in data transmission through the fixed backhaul network and the first wireless backhaul network may be understood as the AP #1 sharing information or data with some APs through the fixed backhaul network and sharing information or data with some APs through the first wireless backhaul network.

Optionally, the first indication information is further used to indicate that the AP #1 does not participate in data transmission. That is, the first indication information is used to indicate that the AP #1 does not participate in D-MIMO transmission.

A format of the first indication information is described below with reference to FIG. 10.

As shown in FIG. 10, the first indication information may include AP indication signaling and/or AP operating configuration information. The AP indication signaling part includes several bits of information, and is used to indicate an operating mode of an AP. The AP operating configuration information is detailed operating configuration information provided when the AP indication signaling indicates a specific operating mode, and for example, may be configuration information corresponding to different backhaul networks in the foregoing descriptions. If the AP indication signaling is empty, the AP operating configuration information does not need to be demodulated.

A quantity of bits included in the AP indication signaling needs to be determined based on designed efficiency of a system. For example, in a scenario in which the fixed backhaul network and the first wireless backhaul network are supported, the AP indication signaling includes 2-bit information (B0, B1), used to indicate different operating modes, as shown in Table 1.

TABLE 1

| (B0, B1) | Operating mode |
|---|---|
| (0, 0) | The AP does not participate in D-MIMO transmission. |
| (0, 1) | The AP participates in D-MIMO transmission through the fixed backhaul network. |
| (1, 0) | The AP participates in D-MIMO transmission through the first wireless |
| (B0, B1) | Operating mode backhaul network. |
| (1, 1) | The AP participates in D-MIMO transmission through the fixed backhaul network and the first wireless backhaul network. |

In another example, in a scenario in which the fixed backhaul network, the first wireless backhaul network, and the second wireless backhaul network are supported, the AP indication signaling may include 3-bit information (B0, B1, B2), used to indicate different operating modes, as shown in Table 2.

TABLE 2

| (B0, B1, B2) | Operating mode |
|---|---|
| (0, 0, 0) | The AP does not participate in D-MIMO transmission. |
| (0, 0, 1) | The AP participates in D-MIMO transmission through the fixed backhaul network. |
| (0, 1, 0) | The AP participates in D-MIMO transmission through the first wireless backhaul network. |
| (1, 0, 0) | The AP participates in D-MIMO transmission through the second wireless backhaul network. |
| (0, 1, 1) | The AP participates in D-MIMO transmission through the fixed backhaul network and the first wireless backhaul network. |
| (1, 0, 1) | The AP participates in D-MIMO transmission through the fixed backhaul network and the second wireless backhaul network. |
| (X, Y, Z) | Reserved for other modes |

Further, when the AP indication signaling indicates the AP is to participate in D-MIMO transmission, the AP may be further indicated to participate in D-MIMO uplink transmission and/or downlink transmission. To be specific, the AP may participate in only uplink transmission or downlink transmission, or the AP may participate in both uplink transmission and downlink transmission. That is, according to this embodiment, a backhaul network established in a downlink transmission slot may be different from a backhaul network established in an uplink transmission slot.

A manner of sending the first indication information by the AP #3 is described below with reference to FIG. 11.

As shown in FIG. 11, the first indication information may be sent in a plurality of manners, to cope with different transmission scenarios and improve transmission efficiency and flexibility of network deployment.

As shown in FIG. 11(a), the AP #3 may transmit the first indication information through single transmission. To be specific, the first indication information sent by the AP #3 to the AP #1 includes AP indication signaling and AP operating configuration information. Correspondingly, after receiving the first indication information from the AP #3, the AP #1 first demodulates the AP indication signaling to determine an operating mode, and further demodulates the AP operating configuration information to determine specific operating configuration information.

As shown in FIG. 11(b), the AP #3 may transmit the first indication information through a plurality of transmission times. To be specific, the AP #3 first sends AP indication signaling to the AP #1, and when data needs to be transmitted, the AP #3 then sends AP operating configuration information to the AP #1, so that system transmission efficiency and flexibility of information transmission can be improved. It can be understood that the AP #3 sends two pieces of first indication information to the AP #1, where the Pt piece of first indication information is used to determine an operating mode, and the $2^{nd}$ piece of first indication information is used to determine operating configuration information.

As shown in FIG. 11(c), if the AP #1 prestores or preconfigures operating configuration information corresponding to different operating modes, the AP #3 may send only AP indication signaling to the AP #1. For example, if the AP #1 prestores operating configuration information corresponding to the operating mode indicated by (0, 0, 1), the AP #3 may send, to the AP #1, first indication information that includes only AP indication signaling. Correspondingly, the AP #1 may determine an operating mode based on the first indication information, and further select, from a local database, operating configuration information corresponding to the operating mode.

Optionally, the first indication information may include a first index value. Correspondingly, the AP #1 may determine, based on a first mapping relationship, an operating mode and/or operating configuration information corresponding to the first index value. The first mapping relationship is used to indicate a correspondence between different index values and different operating modes and/or operating configuration information. The first mapping relationship may be prestored or preconfigured in the AP #1. Table 3 shows an example of the first index value.

TABLE 3

| Index value | Operating configuration information |
|---|---|
| 1 | Operating configuration information #1 |
| 2 | Operating configuration information #1 |
| 3 | Operating configuration information #1 |
| 4 | Operating configuration information #1 |

Optionally, before S610 of FIG. 6, the method 600 may further include the following step: The AP #3 determines the first indication information.

The AP #3 first determines an operating mode and/or operating configuration information of the AP #1 based on a transmission scenario and resources owned for establishing a backhaul network, and then determines the first indication information based on the operating mode and/or the operating configuration information of the AP #1.

The transmission scenario may be, for example, downlink transmission, uplink transmission, large-capacity service transmission, or low-delay service transmission.

The resources owned for establishing a backhaul network may include infrastructure, time-frequency resources, system hardware resources, and the like. The infrastructure is infrastructure between the AP #1 and a network operator. The time-frequency resources are time-frequency resources that can be used by the AP #1 to transmit data. The system hardware resources are hardware resources of the AP #1.

For example, as described above, a capacity of the fixed backhaul network is large, and therefore the AP #1 may be indicated to use the fixed backhaul network when a large-capacity service needs to be transmitted; and a delay of the wireless backhaul network is small, and therefore the AP #1 may be indicated to use the first wireless backhaul network or the second wireless backhaul network when a low-delay service needs to be transmitted.

As another example, if performance of the infrastructure between the AP #1 and the network operator is good (for example, a delay is small), the AP #1 may be alternatively indicated to use the fixed backhaul network when a low-delay service needs to be transmitted.

As another example, if the AP #1 does not include an electromagnetic metasurface antenna array, the AP #1 cannot be indicated to use the second wireless backhaul network.

As another example, if hardware performance of the AP #1 is poor, when the AP #1 is indicated to use the second wireless backhaul network, a reflection mode of a reflecting subarray of the AP #1 is determined to be a directional reflection mode.

Further, after determining the operating mode and/or the operating configuration information of the AP #1, the AP #3 may determine the first indication information based on the operating mode and/or the operating configuration information of the AP #1.

For example, the first indication information may include the operating mode and/or the operating configuration information of the AP #1.

As another example, when the AP #1 prestores or preconfigures the first mapping relationship, the first indication information may include the first index value.

Optionally, the AP #3 may periodically send the first indication information to the AP #1. Correspondingly, after the AP #1 receives new first indication information, if an operating mode and/or operating configuration information determined based on previous first indication information changes, the AP #1 updates and optimizes the operating configuration information, and then continues to transmit data.

Optionally, the AP #3 may semi-persistently send the first indication information to the AP #1.

Optionally, the AP #3 sends the first indication information to the AP #1 when the transmission scenario and the resources owned for establishing a backhaul network change.

Optionally, in S610 of FIG. 6, a central processing unit may send the first indication information to the AP #1.

Optionally, in S610, a central processing unit or the AP #3 may send the first indication information to the AP #1 through a terminal device. To be specific, the central processing unit or the AP #3 sends the first indication information to the terminal device, and then the terminal device sends the first indication information to the AP #1.

FIG. 12 shows an example of sending, by the AP #3, the first indication information to the AP #1 through the terminal device.

As shown in FIG. 12, for different APs, different transmission modes may be selected to transmit first indication information. For example, if the AP #1 prestores or preconfigures operating configuration information corresponding to different operating modes, first indication information sent by the AP #3 to the AP #1 through the terminal device at a moment t1 includes AP indication signaling. As another example, if the AP #3 has previously sent AP indication signaling to an AP #2, the AP #3 sends operating configuration information to the AP #2 through the terminal device at a moment t2. As another example, the AP #3 sends AP indication signaling and AP operating mode configuration information to an AP #4 through the terminal device at a moment t3.

It can be understood that, in a process in which the AP #3 sends the first indication information to the AP #1 through the terminal device, D-MIMO transmission is no longer transparent to the terminal device, and demodulation performed by the terminal device on transmitted data is affected. Although the terminal device forwards the first indication information from the AP #3 to the AP #1, the terminal device can demodulate only a part of data, and cannot obtain all information or real information transmitted by the AP #3 to the AP #1. To demodulate all information, the AP #1 needs to perform decoding by using a unique algorithm or perform decoding in combination with some system information.

FIG. 6, S620: The AP #1 establishes the backhaul network.

The AP #1 determines the operating mode and the operating configuration information in the backhaul network based on the received first indication information, and establishes the backhaul network based on the operating configuration information.

Further, the AP #1 participates in D-MIMO transmission based on the established backhaul network.

According to this embodiment, flexible D-MIMO transmission can be implemented by dynamically configuring a backhaul network construction solution used to support D-MIMO transmission. A new electromagnetic metasurface antenna array is introduced, thereby reducing a delay of the backhaul network and improving transmission efficiency. In addition, the electromagnetic metasurface antenna array has a simple structure, few active devices, and quite high power consumption, is easy to implement and deploy, and is especially applicable to a scenario with a high frequency band, high bandwidth, and massive antennas.

During D-MIMO transmission, a design solution of a precoding vector or a precoding matrix used for data transmission at each AP may be a coherent precoding design based on full channel information or a non-coherent precoding design based on partial channel information. Based on the coherent precoding design, the precoding vector or the precoding matrix at each AP is calculated at the central processing unit or the master AP, and then distributed to the AP through the backhaul network. In this process, due to a delay variation of the backhaul network, moments at which corresponding precoding vectors or precoding matrices arrive at corresponding APs are different, that is, states of precoding vectors or precoding matrices at APs are different. If the APs are based on the non-coherent precoding design, calculation capabilities of the APs are different, causing different states of the precoding vectors or the precoding matrices at the APs. Alternatively, whether the APs participate in D-MIMO transmission at a specific moment also causes different states of the precoding matrices or the precoding vectors of the APs. Therefore, state information of the precoding vectors or the precoding matrices at the APs needs to be shared through the backhaul network in a timely manner.

Sharing of the state information of the precoding vectors or the precoding matrices at the APs determines configuration of downlink control channel parameters by the master AP. To be specific, the master AP needs to configure, for a terminal device, information about APs that participate in D-MIMO transmission, to improve receiving and processing efficiency of the terminal device, for example, efficiency of beam management and joint signal detection at a receive end.

The method 600 may further include S630: The AP #3 sends third indication information to a second communication apparatus.

The second communication apparatus may be a terminal device. An example in which the second communication apparatus is a terminal device is used below for description.

The third indication information is used to indicate information about APs that participate in D-MIMO transmission, and the information about the APs that participate in D-MIMO transmission includes information about the AP #1.

The information about the APs that participate in D-MIMO transmission may include identifiers of the APs that participate in D-MIMO transmission and data transmission modes of the APs that participate in D-MIMO transmission. The data transmission modes of the APs that participate in D-MIMO transmission may include modulation schemes of data streams transmitted by the APs, quantities of data streams transmitted by the APs, beam information of the APs, and a data transmission sequence of the APs.

Optionally, the information about the APs that participate in D-MIMO transmission may further include a type of a backhaul network used by each coordinating AP that participates in D-MIMO transmission. For example, the information about the APs that participate in D-MIMO transmission includes that a type of a backhaul network used by the AP #1 is a fixed backhaul network.

Further, the terminal device may determine, based on the third indication information, a manner of receiving and demodulating downlink data.

According to this embodiment, before D-MIMO transmission, the master AP sends, to the terminal device, information about each coordinating AP that participates in the D-MIMO transmission, so that the terminal device implements more effective beam management and joint signal detection, thereby simplifying a processing capability of the terminal device.

During D-MIMO transmission, based on the non-coherent precoding design, there is a relative phase error between precoding vectors or precoding matrices designed for APs. This is mainly caused by a clock precision error or a clock drift between different APs. In addition, because distances from APs to the terminal device are different, relative moments at which the APs send data need to be pre-adjusted before downlink data is sent, so that signals transmitted by the APs can simultaneously arrive at the terminal device in a specified slot.

A method for synchronizing APs and adjusting moments at which the APs send downlink data in this embodiment is described below with reference to S641 to S644 of FIG. 6.

S641: The terminal device sends a first reference signal. Correspondingly, in S641, the AP #1 receives the first reference signal.

The first reference signal is used to determine a first transmission delay. The first transmission delay is a transmission delay between the AP #3 and the terminal device, and the AP #3 is synchronized with the terminal device in time.

If the AP #1 has a capability of determining a moment for sending data, the AP #1 may adjust, based on the first reference signal, a moment at which data is to be sent to the terminal device. A moment at which the AP #1 sends data to the terminal device is determined based on a first time offset. The first time offset is determined based on the first reference signal, and the first time offset is a time offset of the AP #1 relative to the AP #3.

FIG. 13 is a schematic diagram of a method for determining the first time offset by the AP #1. As shown in FIG. 13, the terminal device sends the first reference signal in a slot n, and the AP #1 receives the first reference signal in a slot n+5. The AP #1 determines, by demodulating the first reference signal, that a moment at which the terminal device sends the first reference signal is the slot n, and determines that a moment at which the AP #3 receives the first reference signal is a slot n+3. In this case, the AP #1 may determine that the transmission delay between the terminal device and the AP #3 is three slots, and the AP #1 may further determine that the first time offset is two slots. This is equivalent to that a transmission delay between the AP #1 and the terminal device is five slots.

As described above, downlink data sent by the AP #3 and the AP #1 to the terminal device needs to simultaneously arrive at the terminal device. In this case, according to FIG. 13, when the time offset of the AP #1 relative to the AP #3 is two slots, the AP #1 sends downlink data to the terminal device two slots in advance relative to the AP #3. For example, if the AP #3 sends downlink data to the terminal device in a slot n+9, the AP #1 sends downlink data to the terminal device in a slot n+7.

If the AP #1 does not have a capability of determining a moment for sending data, the method 600 may further include S642 and S643.

S642: The AP #1 sends a second reference signal to the AP #3. Correspondingly, in S642, the AP #3 receives the second reference signal from the AP #1.

The second reference signal is obtained by the AP #1 by adjusting the first reference signal. That the AP #1 adjusts the first reference signal may include adjusting a phase, an amplitude, a polarization mode, and the like of the first reference signal.

Further, the AP #3 may determine second indication information based on the second reference signal, where the second indication information is used to indicate the first time offset.

FIG. 14 is a schematic diagram of a method for determining the first time offset by the AP #3. As shown in FIG. 14, the terminal device sends the first reference signal in a slot n, the AP #3 receives the first reference signal in a slot n+3, and the AP #3 may determine, by demodulating the first reference signal, that a moment at which the terminal device sends the first reference signal is the slot n. The AP #1 receives the first reference signal in a slot n+5. A time in which the AP #1 adjusts the first reference signal to obtain the second reference signal is ignored. In this case, it may be considered that the AP #1 sends the second reference signal in the slot n+5. The AP #3 receives the second reference signal in a slot n+7. Further, the AP #3 may determine, by demodulating the second reference signal, that a moment at which the AP #1 sends the second reference signal is the slot n+5. In this case, the AP #3 may determine that the transmission delay between the terminal device and the AP #1 is five slots, and the AP #1 further determines, based on the transmission delay (three slots) between the AP #1 and the terminal device, that the first time offset is two slots.

S643: The AP #3 sends the second indication information. Correspondingly, in S643, the AP #1 receives the second indication information.

The AP #1 determines the first time offset based on the second indication information, and further determines, based on the first time offset, a moment at which downlink data is to be sent to the terminal device.

S644: The AP #3 and the AP #1 send downlink data to the terminal device.

A moment at which the AP #1 sends downlink data to the terminal device is determined based on the first time offset.

According to this embodiment, a coordinating AP calculates a time offset between the coordinating AP and the master AP based on a reference signal that comes from the terminal device, or the master AP calculates a time offset between the master AP and each coordinating AP based on a reference signal that comes from the terminal device and a reference signal reflected by the coordinating AP, and sends the time offset to each coordinating AP, so that each coordinating AP can pre-adjust a moment at which downlink data is to be sent. In this way, downlink data sent by the master AP and each coordinating AP can simultaneously arrive at the terminal device. Therefore, a processing capability of the terminal device can be simplified, and receiving performance of the terminal device can be improved.

A method for sending uplink data by the terminal device is described below with reference to S651 and S652 of FIG. 6.

D-MIMO based on an electromagnetic metasurface antenna array can implement an uplink signal receiving solution with a higher speed and a lower delay. As shown in FIG. 15, a master AP of the terminal device is the AP #3, and other APs do not receive uplink data sent by the terminal device, but intelligently reflect the uplink data, so that the uplink data can arrive at the AP #3 through a plurality of controllable paths. This can also be implemented in D-MIMO for a service with a very low delay requirement. However, as shown in FIG. 15, a path through which uplink data arrives at each AP is different from a path through which the AP reflects a signal to the master AP. Therefore, to implement robust receiving and efficient transmission of uplink data, based on a backhaul network established in an uplink transmission slot, the master AP needs to configure a dynamic cyclic prefix (CP) for transmitting uplink data.

S651 of FIG. 6: The AP #3 sends fourth indication information. Correspondingly, in S651, the terminal device receives the fourth indication information.

The fourth indication information is used to indicate configuration information of an uplink CP. The configuration information of the uplink CP is determined based on a path through which uplink data arrives at the AP #3. In other words, the configuration information of the uplink CP is determined based on a transmission delay between the terminal device and each AP and a transmission delay between the master AP and a cooperating AP.

The AP #3 calculates maximum CP duration required and corresponding highest transmission efficiency based on a time difference between a time at which uplink data arrives and a time at which a reflected signal of each AP arrives and based on signal quality, and then selects a corresponding CP according to different service requirements.

For example, the AP #3 may calculate the maximum CP duration required and the corresponding highest transmission efficiency based on the first reference signal and the second reference signal received in S641 and S642, and then select a corresponding CP according to different service requirements.

As shown in FIGS. 16(a) and 16(b), in different scenarios, uplink channels actively designed for a system are different. For example, in FIG. 16(a), the AP #3 selects the AP #4 for establishing an uplink channel. In this case, an uplink CP is designed to obtain a maximum uplink rate or system capacity when a relative transmission delay between a channel UE-AP #3 and a channel UE-AP #4-AP #3 is jointly considered. For another example, in FIG. 16(b), the AP #3 selects the AP #1 and the AP #4 for establishing an uplink channel. In this case, an uplink CP is in an optimal design to obtain maximum performance under joint conditions of a channel UE-AP #3, a channel UE-AP #1-AP #3, and a channel UE-AP #4-AP #3.

A channel between the AP #3 and the terminal device may be actively constructed, and uplink data sent by the user may arrive at the AP #3 through an actively constructed multipath channel Therefore, a delay of the multipath channel may be actively controlled. If an optimal uplink CP is designed by using the dynamically constructed uplink channel and a multipath delay of the uplink channel, when uplink transmission performance of the terminal device is improved, it can be ensured that an uplink transmission delay is not affected by a D-MIMO backhaul network. To indicate a specific uplink CP used by the terminal device, the AP #3 may send the fourth indication information to the terminal device to indicate configuration information of the uplink CP.

FIG. 17 shows an example of a format of the fourth indication information. As shown in FIG. 17, the fourth indication information may include a CP indication field and a CP parameter configuration field. The CP indication field may include 2-bit information (b0, b1) used to indicate an uplink CP configuration mode, as shown in Table 4.

TABLE 4

| (b0, b1) | Uplink CP configuration mode |
|---|---|
| (0, 0) | The terminal device is configured to use a normal CP and default system parameters for transmission. |
| (0, 1) | The terminal device is configured to use a longest CP and default system parameters for transmission. |
| (1, 0) | A dynamic uplink CP is configured. The dynamic CP can be used only for data symbols. Specific transmission parameters are obtained by demodulating the parameter configuration field. |
| (1, 1) | A dynamic uplink CP is configured. The dynamic CP can be used for control symbols and data symbols. Specific transmission parameters are obtained by demodulating the parameter configuration field. |

In one embodiment, the normal CP is a conventional CP and is 4.687 μs. The longest CP is an extended CP and is 16.67 μs. The dynamic uplink CP is a CP determined by the AP #3 based on the dynamically constructed multipath uplink channel. It can be understood that duration of the dynamic uplink CP is less than duration of the longest CP.

After determining the uplink CP configuration mode by demodulating the CP indication field, the AP #1 may further demodulate the CP configuration parameter field to determine specific parameters used for uplink transmission. It can be understood that, if the AP #1 stores the default system parameters, when the CP indication field is (0, 0) or (0, 1), the AP #1 may not demodulate the CP parameter configuration field. The default system parameters may include system default duration of the normal CP and/or the longest CP, and may include a quantity of symbols included in each radio frame or each slot. If the AP #1 determines that the uplink CP configuration mode is a dynamic uplink CP, the AP #1 continues to demodulate the CP parameter configuration field to obtain uplink transmission parameters. The uplink transmission parameters obtained by the AP #1 by demodulating the CP parameter configuration field may include duration of the dynamic CP, and may include a quantity of symbols included in each radio frame or each slot.

The AP #3 dynamically configures the normal CP and the longest CP for the terminal device, so that transmission performance of the terminal device can be improved. Further, when a backhaul network is dynamically established in an uplink transmission slot, the AP #3 supports dynamic configuration of an uplink CP for the terminal device. Therefore, performance of the terminal device may be further improved.

S652 of FIG. 6: The terminal device sends uplink data. Correspondingly, in S652, the AP #3 receives the uplink data, and the AP #1 receives the uplink data and reflects the uplink data to the AP #3.

Optionally, if APs that establish a backhaul network in an uplink transmission slot operate by using a plurality of types of backhaul networks, the terminal device may send different types of data.

For example, in a backhaul network shown in FIG. 18 that is established in an uplink transmission slot, each AP may use either a fixed backhaul network or a wireless backhaul network (the first wireless backhaul network or the second wireless backhaul network). In this case, the terminal device may send different types of data. For example, for a service that is sent by the terminal device and that has a strict delay requirement, each AP may use the wireless backhaul network for transmission; and for a large-capacity service sent by the terminal device, each AP may use the fixed backhaul network for transmission.

According to this embodiment, the master AP designs a dynamic uplink CP based on a dynamically constructed uplink channel, so that uplink transmission efficiency can be improved.

The methods in embodiments are described above in detail with reference to FIG. 6 to FIG. 18. Apparatuses in embodiments are described below in detail with reference to FIG. 19 to FIG. 21. It should be noted that the apparatuses shown in FIG. 19 to FIG. 21 may implement the steps in the foregoing methods. For brevity, details are not described herein again.

FIG. 19 is a schematic block diagram of a communication apparatus according to an embodiment. As shown in FIG. 19, the communication apparatus 2000 may include a processing unit 2100 and a transceiver unit 2200.

In a possible design, the communication apparatus 2000 may correspond to the first communication apparatus in the foregoing method embodiments, for example, apparatus 2000 may be the first communication apparatus or a component (for example, a chip or a chip system) configured in the first communication apparatus.

It should be understood that the communication apparatus 2000 may correspond to the first communication apparatus in the method 600 according to embodiments, and the communication apparatus 2000 may include units configured to perform the method performed by the first communication apparatus in the method 600 in FIG. 6. In addition, the units in the communication apparatus 2000 and the foregoing other operations and/or functions are respectively intended to implement corresponding procedures of the method 600 in FIG. 6. It should be understood that a specific process in which the units perform the foregoing corresponding steps has been described in detail in the foregoing method embodiments. For brevity, details are not described herein again.

It should be further understood that the first communication apparatus may be a network device, for example, may be an AP. Correspondingly, the communication apparatus 2000 may be a network device, for example, a network device or a component (for example, a chip or a chip system) configured in a network device. When the communication apparatus 2000 is a chip or a chip system configured in a network device, the transceiver unit 2200 in the communication apparatus 2000 may be implemented by using an input/output interface, and the processing unit 2100 in the communication apparatus 2000 may be implemented by using a processor, a microprocessor, an integrated circuit, or the like integrated in the chip or the chip system.

In another possible design, the communication apparatus 2000 may correspond to the second communication apparatus in the foregoing method embodiments, for example, the second communication apparatus or a component (for example, a chip or a chip system) configured in the second communication apparatus.

It should be understood that the communication apparatus 2000 may correspond to the second communication apparatus in the method 600 according to embodiments, and the communication apparatus 2000 may include units configured to perform the method performed by the second communication apparatus in the method 600 in FIG. 6. In addition, the units in the communication apparatus 2000 and the foregoing other operations and/or functions are respectively intended to implement corresponding procedures of the method 600 in FIG. 6. It should be understood that a specific process in which the units perform the foregoing corresponding steps has been described in detail in the foregoing method embodiments. For brevity, details are not described herein again.

It should be further understood that the second communication apparatus may be a terminal device. Correspondingly, the communication apparatus 2000 may be a terminal device, for example, a terminal device or a component (for example, a chip or a chip system) configured in a terminal device. When the communication apparatus 2000 is a chip or a chip system configured in a terminal device, the transceiver unit 2200 in the communication apparatus 2000 may be implemented by using an input/output interface, and the processing unit 2100 in the communication apparatus 2000 may be implemented by using a processor, a microprocessor, an integrated circuit, or the like integrated in the chip or the chip system.

In still another possible design, the communication apparatus 2000 may correspond to the third communication apparatus in the foregoing method embodiments, for example, the third communication apparatus or a component (for example, a chip or a chip system) configured in the third communication apparatus.

It should be understood that the communication apparatus 2000 may correspond to the third communication apparatus in the method 600 according to embodiments, and the communication apparatus 2000 may include units configured to perform the method performed by the third communication apparatus in the method 600 in FIG. 6. In addition, the units in the communication apparatus 2000 and the foregoing other operations and/or functions are respectively intended to implement corresponding procedures of the method 600 in FIG. 6. It should be understood that a specific process in which the units perform the foregoing corresponding steps has been described in detail in the foregoing method embodiments. For brevity, details are not described herein again.

It should be further understood that the third communication apparatus may be a network device. Correspondingly, the communication apparatus 2000 may be a network device, for example, a network device or a component (for example, a chip or a chip system) configured in a network device. When the communication apparatus 2000 is a chip or a chip system configured in a network device, the transceiver unit 2200 in the communication apparatus 2000 may be implemented by using an input/output interface, and the processing unit 2100 in the communication apparatus 2000 may be implemented by using a processor, a microprocessor, an integrated circuit, or the like integrated in the chip or the chip system.

FIG. 20 is a schematic block diagram of a communication apparatus according to another embodiment. The communication apparatus 3000 shown in FIG. 20 may include a memory 3100, a processor 3200, and a communication interface 3300. The memory 3100, the processor 3200, and the communication interface 3300 are connected through an internal connection path. The memory 3100 is configured to store instructions. The processor 3200 is configured to execute the instructions stored in the memory 3100, to control the communication interface 3000 to send/receive first indication information. Optionally, the memory 3100 may be coupled to the processor 3200 through an interface, or may be integrated with the processor 3200.

It should be noted that the communication interface 3300 uses a transceiver apparatus, for example, but not limited to, a transceiver, to implement communication between the communication apparatus 3000 and another device or a communication network. The communication interface 3300 may further include an input/output interface.

In an implementation process, the steps in the foregoing method may be implemented by using a hardware integrated logical circuit in the processor 3200, or by using instructions in a form of software. The method of the communication disclosed with reference to embodiments may be directly performed by a hardware processor, or may be performed by using a combination of hardware in the processor and a software module. The software module may be located in a mature technology storage medium in the art, such as a random access memory, a flash memory, a read-only memory, a programmable read-only memory, an electrically erasable programmable memory, or a register. The storage medium is located in the memory 3100, and a processor 3200 reads information in the memory 3100 and completes the steps in the foregoing methods in combination with hardware of the processor. To avoid repetition, details are not described herein again.

It should be understood that, the processor in embodiments may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should also be understood that in embodiments, the memory may include a read-only memory and a random access memory, and provide an instruction and data to the processor. A part of the processor may further include a non-volatile random access memory. For example, the processor may further store information of a device type.

FIG. 21 is a schematic diagram of a chip system according to an embodiment. The chip system 4000 shown in FIG. 21 includes a logic circuit 4100 and an input/output interface 4200. The logic circuit is configured to be coupled to the input/output interface and transmit data (for example, first indication information) through the input/output interface, to perform the method in FIG. 6.

An embodiment further provides a processing apparatus, including a processor and an interface. The processor is configured to perform the method in any one of the foregoing method embodiments.

It should be understood that the processing apparatus may be one or more chips. For example, the processing apparatus may be an FPGA, an ASIC, a system on chip (SoC), a CPU, a network processor (network processor, NP), a DSP, a micro controller unit (MCU), or a programmable logic device (PLD) or another integrated chip.

In an implementation process, the steps in the foregoing methods can be implemented by using a hardware integrated logic circuit in the processor, or by using instructions in a form of software. The steps of the method disclosed with reference to embodiments may be directly performed by a hardware processor, or may be performed by a combination of hardware and software modules in the processor. The software module may be located in a mature technology storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that, the processor in this embodiment may be an integrated circuit chip with a signal processing capability. In an implementation process, steps in the foregoing method embodiments are implemented by using a hardware integrated logic circuit in the processor, or by using instructions in the form of software. The processor may be a general purpose processor, a DSP, an ASIC, an FPGA or another programmable logic device, a discrete gate or a transistor logic device, or a discrete hardware component. The processor may implement or perform the methods, steps, and logical block diagrams that are disclosed in embodiments. The general-purpose processor may be a microprocessor, or the processor may be any conventional processor or the like. The steps in the methods disclosed with reference to embodiments may be directly performed and completed by a hardware decoding processor, or may be performed and completed by using a combination of hardware in the decoding processor and a software module. The software module may be located in a mature technology storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in embodiments may be a volatile memory or a non-volatile memory, or may include a volatile memory and a non-volatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a random access memory (RAM) used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

According to the methods provided in embodiments, this specification further provides a computer program product. The computer program product includes computer program code. When the computer program code is run on a computer, the computer is enabled to perform the methods respectively performed by the first communication apparatus, the second communication apparatus, and the third communication apparatus in the embodiment shown in FIG. 6.

According to the methods provided in embodiments, this specification further provides a computer-readable storage medium. The computer-readable storage medium stores program code. When the program code is run on a computer, the computer is enabled to perform the methods respectively performed by the first communication apparatus, the second communication apparatus, and the third communication apparatus in the embodiment shown in FIG. 6.

According to the methods provided in embodiments, this specification further provides a system, including one or more first communication apparatuses, one or more second communication apparatuses, and one or more third communication apparatuses. The first communication apparatus and the third communication apparatus may be network devices, and the second communication apparatus may be a terminal device.

The network device and the terminal device in the apparatus embodiments exactly correspond to the network device or the terminal device in the method embodiments, and corresponding modules or units perform corresponding steps. For example, a communication unit (a transceiver) performs a sending or receiving step in the method embodiments, and steps other than sending and receiving may be performed by a processing unit (a processor). For functions of specific units, refer to corresponding method embodiments. There may be one or more processors.

Terms such as "component", "module", and "system" used in this specification are used to indicate a computer-related entity, hardware, firmware, a combination of hardware and software, software, or software being executed. For example, a component may be, but is not limited to, a process that is run on a processor, a processor, an object, an executable file, a thread of execution, a program, and/or a computer. As illustrated by using figures, both an application that is run on the computing device and a computing device may be components. One or more components may reside within a process and/or an execution thread, and a component may be located on one computer and/or distributed between two or more computers. In addition, these components may be executed by various computer-readable media that store various data structures. The components may communicate by using a local and/or remote process and based on, for example, a signal having one or more data packets (for example, data from two components interacting with another component in a local system, in a distributed system, and/or across a network such as the internet interacting with other systems by using the signal).

A person of ordinary skill in the art may be aware that, in combination with illustrative logical blocks described in embodiments disclosed in this specification, steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, and it should not be considered that such implementations go beyond the scope of this disclosure.

It may be clearly understood by a person skilled in the art that, for the purpose of convenient and brief description, for a detailed working process of the foregoing system, apparatus, and unit, one may refer to a corresponding process in the foregoing method embodiments, and details are not described herein again for brevity.

In several embodiments provided in this specification, it should be understood that the disclosed system, apparatus, and method may be implemented in another manner. For example, the described apparatus embodiment is merely an example. For example, division into the units is merely logical function division and other division may be used in actual implementations. For example, a plurality of units or components may be combined or integrated into another system, or some features may be ignored or not performed. In addition, the displayed or discussed mutual couplings or direct couplings or communication connections may be implemented through interfaces. The indirect couplings or communication connections between the apparatuses or units may be implemented in electrical, mechanical, or some other form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments may be integrated into one processing unit, each of the units may exist alone physically, or two or more units may be integrated into one unit.

In the foregoing embodiments, all or some of the functions of the functional units may be implemented by software, hardware, firmware, or any combination thereof. When software is used to implement the embodiments, all or a part of the embodiments may be implemented in a form of a computer program product. The computer program product includes one or more computer instructions (programs). When the computer program instructions (programs) are loaded and executed on a computer, the procedures or functions according to embodiments are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments. The foregoing storage medium includes any medium that can store program code, such as a USB flash drive, a removable hard disk, a ROM, a RAM, a magnetic disk, or an optical disc.

The foregoing descriptions are merely specific implementations, but are not intended to limit the protection scope. Any variation or replacement readily figured out by a person skilled in the art within the technical scope disclosed in this specification shall fall within the protection scope. Therefore, the protection scope shall be defined by the claims.

What is claimed is:

1. A method for establishing a backhaul network, comprising:

receiving, by a first communication apparatus, first indication information, wherein the first indication information is used to determine an operating mode and/or operating configuration information of the first communication apparatus in a backhaul network, the first communication apparatus comprises a first antenna array, and the first antenna array is an electromagnetic radio frequency metasurface antenna array;

receiving by the first communication apparatus, a first reference signal from a second communication apparatus, wherein the first reference signal is used to determine a first transmission delay, the first transmission delay is a transmission delay between the second communication apparatus and a third communication apparatus, and the second communication apparatus is synchronized with the third communication apparatus in time;

sending, by the first communication apparatus, data to the second communication apparatus, wherein a moment at which the data is sent is determined based on a first time offset, the first time offset is determined by the first communication apparatus based on the first reference signal, and the first time offset is a time offset of the first communication apparatus relative to the third communication apparatus; and establishing, by the first communication apparatus, the backhaul network based on the first indication information.

2. The method according to claim 1, wherein the operating mode of the first communication apparatus in the backhaul network comprises one or more of the following:

participating in data transmission through a fixed backhaul network, participating in data transmission through a first wireless backhaul network, and participating in data transmission through a second wireless backhaul network, wherein the data transmission comprises uplink data transmission and/or downlink data transmission, and the second wireless backhaul network comprises the first communication apparatus.

3. The method according to claim 2, wherein operating configuration information corresponding to the fixed backhaul network comprises at least one of the following: a transmission capacity and a delay variation range;

operating configuration information corresponding to the first wireless backhaul network comprises at least one of the following: time domain resource configuration information, frequency domain resource configuration information, space domain resource configuration information, or data transmission sequence information; and operating configuration information corresponding to the second wireless backhaul network comprises at least one of the following: a time at which the second wireless backhaul network is established, a transmission object, a transmission waveform, and a modulation scheme, wherein the time at which the second wireless backhaul network is established comprises a time at which a reflecting subarray is enabled.

4. The method according to claim 1, wherein the first communication apparatus further comprises a second antenna array.

5. The method according to claim 1, wherein the first antenna array comprises a reflecting subarray, or the first antenna array comprises a reflecting subarray and a receiving subarray.

6. The method according to claim 1, wherein the first indication information comprises a first index value, and the method further comprises:

determining, by the first communication apparatus based on a first mapping relationship, an operating mode and/or operating configuration information corresponding to the first index value, wherein the first mapping relationship is used to indicate a correspondence between different index values and different operating modes and/or operating configuration information.

7. A method for establishing a backhaul network, comprising:

receiving by a first communication apparatus first indication information, wherein the first indication information is used to determine an operating mode and/or operating configuration information of the first communication apparatus in a backhaul network, the first communication apparatus comprises a first antenna array, and the first antenna array is an electromagnetic radio frequency metasurface antenna array;

receiving, by the first communication apparatus, a first reference signal from a second communication apparatus, wherein the second communication apparatus is synchronized with a third communication apparatus in time;

sending, by the first communication apparatus, a second reference signal to the third communication apparatus, wherein the second reference signal is obtained by adjusting the first reference signal;

receiving, by the first communication apparatus, second indication information from the third communication apparatus, wherein the second indication information is used to indicate a first time offset, and the first time offset is a time offset of the first communication apparatus relative to the third communication apparatus; and sending, by the first communication apparatus, data to the second communication apparatus, wherein a moment at which the data is sent is determined based on the first time offset; and establishing, by the first communication apparatus, the backhaul network based on the first indication information.

8. A method for establishing a backhaul network, comprising:

determining, by a third communication apparatus, first indication information, wherein the first indication information is used to determine an operating mode and/or operating configuration information of a first communication apparatus in a backhaul network, the first communication apparatus comprises a first antenna array, and the first antenna array is an electromagnetic radio frequency metasurface antenna array;

receiving by the third communication apparatus, a second reference signal from the first communication apparatus, wherein the second reference signal is obtained by the first communication apparatus by adjusting a first reference signal that comes from a second communication apparatus, and the second communication apparatus is synchronized with the third communication apparatus in time;

determining, by the third communication apparatus, second indication information based on the second reference signal, wherein the second indication information is used to indicate a first time offset, the first time offset is a time offset of the first communication apparatus relative to the third communication apparatus, and the first time offset is used by the first communication apparatus to determine a moment at which data is to be sent to the second communication apparatus;

sending, by the third communication apparatus, the second indication information to the first communication apparatus; and sending, by the third communication apparatus, the first indication information to the first communication apparatus.

9. The method according to claim 8, wherein the operating mode of the first communication apparatus in the backhaul network comprises one or more of the following: participating in data transmission through a fixed backhaul network, participating in data transmission through a first wireless backhaul network, and participating in data transmission through a second wireless backhaul network, wherein the data transmission comprises uplink data transmission and/or downlink data transmission, and the second wireless backhaul network comprises the first communication apparatus.

10. The method according to claim 9, wherein operating configuration information corresponding to the fixed backhaul network comprises at least one of the following:

a transmission capacity and a delay variation range;

operating configuration information corresponding to the first wireless backhaul network comprises at least one of the following: time domain resource configuration information, frequency domain resource configuration information, space domain resource configuration information, and data transmission sequence information; and operating configuration information corresponding to the second wireless backhaul network comprises at least one of the following: a time at which the second wireless backhaul network is established, a transmission object, a transmission waveform, and a modulation scheme.

11. The method according to claim 8, wherein the first communication apparatus further comprises a second antenna array.

12. The method according to claim 8, wherein the first antenna array comprises a reflecting subarray, or the first antenna array comprises a reflecting subarray and a receiving subarray.

13. The method according to claim 8, wherein the first indication information comprises a first index value, and the determining, by a third communication apparatus, first indication information comprises:

determining, by the third communication apparatus, the first index value based on a first mapping relationship, wherein the first mapping relationship is used to indicate a correspondence between different index values and different operating modes and/or operating configuration information.

14. The method according to claim 8, wherein the method further comprises:

sending, by the third communication apparatus, third indication information to the second communication apparatus, wherein the third indication information is used to indicate information about the first communication apparatus.

15. The method according to claim 8, wherein the method further comprises:

sending, by the third communication apparatus, fourth indication information to the second communication apparatus, wherein the fourth indication information is used to indicate configuration information of an uplink cyclic prefix (CP), and the configuration information of the uplink CP is determined based on a path through which uplink data arrives at the third communication apparatus.

* * * * *